United States Patent
Saltsidis et al.

(10) Patent No.: US 9,654,418 B2
(45) Date of Patent: May 16, 2017

(54) METHOD AND SYSTEM OF SUPPORTING OPERATOR COMMANDS IN LINK AGGREGATION GROUP

(71) Applicant: Telefonaktiebolaget L M Ericsson (publ), Stockholm (SE)

(72) Inventors: Panagiotis Saltsidis, Stockholm (SE); János Farkas, Kecskemét (HU); Glenn Parsons, Ottawa (CA)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 55 days.

(21) Appl. No.: 14/167,155

(22) Filed: Jan. 29, 2014

(65) Prior Publication Data
US 2015/0124837 A1    May 7, 2015

Related U.S. Application Data

(60) Provisional application No. 61/900,284, filed on Nov. 5, 2013.

(51) Int. Cl.
*H04L 12/24* (2006.01)
*H04L 12/911* (2013.01)
(Continued)

(52) U.S. Cl.
CPC ........ *H04L 47/827* (2013.01); *H04L 41/0879* (2013.01); *H04L 41/0893* (2013.01);
(Continued)

(58) Field of Classification Search
None
See application file for complete search history.

(56) References Cited

U.S. PATENT DOCUMENTS

| 6,430,183 B1 | 8/2002 | Satran |
| 6,445,715 B1 | 9/2002 | Annaamalai et al. |

(Continued)

FOREIGN PATENT DOCUMENTS

| EP | 2701342 | 2/2014 |
| JP | 2011-508501 A | 3/2011 |

(Continued)

OTHER PUBLICATIONS

RFC 3140: Black, et al., "Per Hop Behavior Identification Codes," Network Working Group, Request for Comments, The Internet Society, Jun. 2001, 8 pages.
(Continued)

*Primary Examiner* — Anh-Vu Ly
*Assistant Examiner* — Hector Reyes Ortiz
(74) *Attorney, Agent, or Firm* — Nicholson De Vos Webster & Elliott LLP

(57) ABSTRACT

A method is disclosed that is to be executed for supporting operator commands in a link aggregation group at a network device. The method starts with receiving a local operator command for changing aggregation port priority of the link aggregation group, where the local operator command contains operator command attributes including an operator command aggregation port prioritized list. The method continues with determining that the operator command aggregation port prioritized list is different from a remote aggregation port prioritized list used at the remote network device. The network device then transmits a set of operator command attributes associated with the local operator command to the remote network device and performs the local operator command by setting a local aggregation port prioritized list to be consistent with the operator command aggregation port prioritized list for the link aggregation group.

29 Claims, 9 Drawing Sheets

(51) Int. Cl.
*H04L 12/755* (2013.01)
*H04L 12/709* (2013.01)
*H04L 12/713* (2013.01)

(52) U.S. Cl.
CPC .......... *H04L 45/021* (2013.01); *H04L 45/245* (2013.01); *H04L 45/586* (2013.01); *H04L 41/0869* (2013.01); *Y02B 60/33* (2013.01)

(56) References Cited

U.S. PATENT DOCUMENTS

| | | | |
|---|---|---|---|
| 6,553,568 B1 | 4/2003 | Fijolek et al. | |
| 6,687,751 B1* | 2/2004 | Wils | H04L 12/413 370/401 |
| 6,910,149 B2 | 6/2005 | Perloff et al. | |
| 7,787,447 B1 | 8/2010 | Egan et al. | |
| 7,869,432 B1 | 1/2011 | Mollyn | |
| 8,243,594 B1 | 8/2012 | Fotedar et al. | |
| 8,422,485 B2 | 4/2013 | Jung et al. | |
| 8,472,312 B1 | 6/2013 | Yang et al. | |
| 9,143,439 B2 | 9/2015 | Wang et al. | |
| 9,264,298 B2 | 2/2016 | Gero et al. | |
| 2002/0040389 A1 | 4/2002 | Gerba et al. | |
| 2006/0058059 A1 | 3/2006 | Kim | |
| 2006/0159268 A1 | 7/2006 | Jung et al. | |
| 2006/0227704 A1 | 10/2006 | Nakagawa et al. | |
| 2006/0227711 A1 | 10/2006 | Nakagawa et al. | |
| 2006/0251106 A1 | 11/2006 | Nakagawa et al. | |
| 2007/0127464 A1 | 6/2007 | Jain et al. | |
| 2007/0150614 A1 | 6/2007 | Ramachandran et al. | |
| 2007/0280258 A1 | 12/2007 | Rajagopalan et al. | |
| 2008/0155112 A1 | 6/2008 | Ma et al. | |
| 2008/0219185 A1 | 9/2008 | Zou et al. | |
| 2008/0291919 A1 | 11/2008 | Dunbar et al. | |
| 2009/0073873 A1 | 3/2009 | MacAdam et al. | |
| 2009/0135838 A1 | 5/2009 | Rouyer et al. | |
| 2009/0225752 A1* | 9/2009 | Mitsumori | H04L 45/245 370/390 |
| 2009/0252170 A1* | 10/2009 | Hu | H04L 12/4675 370/395.53 |
| 2010/0182920 A1 | 7/2010 | Matsuoka | |
| 2011/0075559 A1 | 3/2011 | Katsura | |
| 2011/0167101 A1 | 7/2011 | Hopen et al. | |
| 2011/0194404 A1* | 8/2011 | Kluger | H04L 12/40189 370/218 |
| 2011/0200046 A1 | 8/2011 | Kojima et al. | |
| 2011/0211585 A1 | 9/2011 | Kodaka et al. | |
| 2012/0027017 A1 | 2/2012 | Rai et al. | |
| 2012/0039338 A1 | 2/2012 | Morimoto | |
| 2012/0233492 A1* | 9/2012 | Finn | H04L 45/586 714/4.1 |
| 2012/0236859 A1 | 9/2012 | Subramanian et al. | |
| 2012/0275297 A1 | 11/2012 | Subramanian | |
| 2013/0022044 A1 | 1/2013 | Tatsumi et al. | |
| 2013/0201822 A1 | 8/2013 | Liang | |
| 2013/0287038 A1 | 10/2013 | Zhou et al. | |
| 2013/0301427 A1 | 11/2013 | Tsai et al. | |
| 2013/0308455 A1 | 11/2013 | Kapadia et al. | |
| 2014/0025736 A1* | 1/2014 | Wang | H04L 45/46 709/204 |
| 2014/0064056 A1 | 3/2014 | Sakata et al. | |
| 2014/0089492 A1* | 3/2014 | Nelson | H04L 67/325 709/224 |
| 2014/0112191 A1* | 4/2014 | Farkas | H04L 45/245 370/254 |
| 2014/0115189 A1* | 4/2014 | Ao | H04L 45/245 709/250 |
| 2014/0226457 A1* | 8/2014 | Hsueh | H04L 43/50 370/216 |
| 2014/0281669 A1* | 9/2014 | DeCusatis | G06F 11/2005 714/4.11 |
| 2014/0313932 A1 | 10/2014 | Saltsidis | |
| 2014/0313938 A1 | 10/2014 | Saltsidis | |
| 2014/0313939 A1 | 10/2014 | Saltsidis | |
| 2014/0314094 A1 | 10/2014 | Saltsidis et al. | |
| 2014/0314095 A1 | 10/2014 | Saltsidis et al. | |
| 2014/0314097 A1 | 10/2014 | Saltsidis | |
| 2014/0317250 A1 | 10/2014 | Saltsidis | |
| 2014/0321268 A1 | 10/2014 | Saltsidis | |
| 2014/0347994 A1 | 11/2014 | Kapadia et al. | |
| 2015/0023351 A1 | 1/2015 | Rajagopalan et al. | |
| 2015/0271068 A1* | 9/2015 | Wei | H04W 36/00 370/242 |
| 2015/0271088 A1* | 9/2015 | Ao | H04L 47/41 370/276 |
| 2016/0065407 A1 | 3/2016 | Saltsidis | |

FOREIGN PATENT DOCUMENTS

| | | |
|---|---|---|
| WO | 2012018521 A1 | 2/2012 |
| WO | WO-2012065336 A1 | 5/2012 |
| WO | WO-2012142910 | 10/2012 |
| WO | WO-2013127416 | 9/2013 |
| WO | WO-2013171552 | 11/2013 |

OTHER PUBLICATIONS

RFC 3209: Awduche, et al., "RSVP-TE: Extensions to RSVP for LSP Tunnels," Network Working Group, Request for Comments, The Internet Society, Dec. 2001, 61 Pages.

RFC 3246: Davie, et al., "An Expedited Forwarding PHB (Per-Hop Behavior)," Network Working Group, Request for Comments, The Internet Society, Mar. 2002, 16 pages.

RFC 3247: Charny, et al., "Supplemental Information for the New Definition of the EF PHB (Expedited Forwarding Per-Hop Behavior)," Network Working Group, Request for Comments, The Internet Society, Mar. 2002, 24 pages.

RFC 3260: Grossman, "New Terminology and Clarifications for Diffserv," Network Working Group, Request for Comments, The Internet Society, Apr. 2002, 10 pages.

RFC 3289: Baker, et al., "Management Information Base for the Differentiated Services Architecture," Network Working Group, Request for Comments, The Internet Society, May 2002, 116 pages.

RFC 3290: Bernet, et al., "An Informal Management Model for Diffserv Routers," Network Working Group, Request for Comments, The Internet Society, May 2002, 56 pages.

RFC 3317: Chan, et al., "Differentiated Services Quality of Service Policy Information Base," Network Working Group, Request for Comments, The Internet Society, Mar. 2003, 96 pages.

RFC 3473: Berger, "Generalized Multi-Protocol Label Switching (GMPLS) Signaling Resource ReserVation Protocol-Traffic Engineering (RSVP-TE) Extensions," Network Working Group, Request for Comments, The Internet Society, Jan. 2003, 42 pages.

RFC 3936: Kompella, et al., "Procedures for Modifying the Resource reSerVation Protocol (RSVP)," Network Working Group, Request for Comments, The Internet Society, Oct. 2004, 7 pages.

RFC 4113: Fenner, et al., "Management Information Base for the User Datagram Protocol (UDP)," Network Working Group, Request for Comments, The Internet Society, Jun. 2005, 19 pages.

RFC 4271: Rekhter, et al., "A Border Gateway Protocol 4 (BGP-4)," Network Working Group, Request for Comments, The Internet Society, Jan. 2006, 104 pages.

RFC 4301: Kent, et al., "Security Architecture for the Internet Protocol," Network Working Group, Request for Comments, The Internet Society, Dec. 2005, 101 pages.

RFC 4309: Housley, et al., "Using Advanced Encryption Standard (AES) CCM Mode with IPsec Encapsulating Security Payload (ESP)," Network Working Group, Request for Comments, The Internet Society, Dec. 2005, 13 pages.

RFC 4495: Polk, et al., "A Resource Reservation Protocol (RSVP) Extension for the Reduction of Bandwidth of a Reservation Flow," Network Working Group, Request for Comments, The Internet Society, May 2006, 21 pages.

RFC 4558: Ali, et al., "Node-ID Based Resource Reservation Protocol (RSVP) Hello: A Clarification Statement," Network Working Group, Request for Comments, The Internet Society, Jun. 2006, 7 pages.

(56) References Cited

OTHER PUBLICATIONS

RFC 4594: Babiarz, et al., "Configuration Guidelines for DiffServ Service Classes," Network Working Group, Request for Comments, The Internet Society, Aug. 2006, 57 pages.
RFC 4761: Kompella, et al., "Virtual Private LAN Service (VPLS) Using BGP for Auto-Discovery and Signaling," Network Working Group, Request for Comments, The IETF Trust, Jan. 2007, 28 pages.
RFC 4762: Lasserre, et al., "Virtual Private LAN Service (VPLS) Using Label Distribution Protocol (LDP) Signaling," Network Working Group, Request for Comments, The IETF Trust, Jan. 2007, 31 pages.
RFC 5036: Andersson, et al., "LDP Specification," Network Working Group, Request for Comments, The IETF Trust, Oct. 2007, 135 pages.
RFC 5340: Coltun, et al., "OSPF for IPv6," Network Working Group, Request for Comments, The IETF Trust, Jul. 2008, 94 pages.
RFC 5405: Eggert, et al., "Unicast UDP Usage Guidelines for Application Designers," Network Working Group, Request for Comments, IETF Trust and the persons identified as the document authors, Nov. 2008, 27 pages.
RFC 5865: Baker, et al., "A Differentiated Services Code Point (DSCP) for Capacity-Admitted Traffic," Internet Engineering Task Force (IETF), Request for Comments, IETF Trust and the persons identified as the document authors, May 2010, 14 pages.
Written Opinion of the International Preliminary Examining Authority, Application No. PCT/IB2014/060912, dated Mar. 30, 2015, 8 pages.
International Preliminary Report on Patentablility, Application No. PCT/IB2014/060912, dated Aug. 7, 2015, 64 pages.
Written Opinion of the International Preliminary Examining Authority, Application No. PCT/IB2014/060913, dated Apr. 2, 2015, 10 pages.
International Preliminary Report on Patentability, Application No. PCT/IB2014/060913, dated Aug. 4, 2015, 50 pages.
Written Opinion of the International Preliminary Examining Authroity, Application No. PCT/IB2014/060914, dated Mar. 30, 2015, 10 pages.
International Preliminary Report on Patentability, Application No. PCT/IB2014/060914, dated Aug. 4, 2015, 64 pages.
Written Opinion of the Interational Preliminary Examining Authority, Application No. PCT/IB2014/060915, dated Apr. 8, 2015, 8 pages.
International Preliminary Report on Patentability, Application No. PCT/IB2014/060915, dated Jul. 30, 2015, 66 pages.
Written Opinion of the International Preliminary Examining Authority, Application No. PCT/IB2014/060916, dated Apr. 1, 2015, 8 pages.
International Preliminary Report on Patentability, Application No. PCT/IB2014/060916, dated Aug. 4, 2015, 64 pages.
Written Opinion of the International Preliminary Examining Authroity, Application No. PCT/IB2014/060917, dated Apr. 8, 2015, 11 pages.
International Preliminary Report on Patentability, Application No. PCT/IB2014/060917, dated Aug. 4, 2015, 70 pages.
Written Opinion of the International Preliminary Examining Authority, Application No. PCT/SE2014/050282, dated May 6, 2015, 5 pages.
International Preliminary Report on Patentability, Application No. PCT/SE2014/050282, dated Jul. 27, 2015, 23 pages.
Written Opinion of the International Preliminary Examining Authority, Application No. PCT/SE2014/050283, dated Mar. 23, 2015, 7 pages.
International Preliminary Report on Patentability, Application No. PCT/SE2014/050283, dated Jul. 1, 2015, 8 pages.
Non-Final Office Action, U.S. Appl. No. 14/134,966, dated Jun. 17, 2015, 17 pages.
Non-Final Office Action, U.S. Appl. No. 14/135,556, dated Nov. 6, 2015, 34 pages.

IEEE 802.1AC-2012, "Media Access Control (MAC) Service Definition," Standard for Local and metropolitan area networks, Institute of Electrical and Electronics Engineers, Inc. (IEEE), Sep. 14, 2012, 43 pages.
IEEE 802.1ad-2005, "Virtual Bridged Local Area Networks, Amendment 4: Provider Bridges," Standard for Local and metropolitan area networks, Institute of Electrical and Electronics Engineers, Inc. (IEEE), May 26, 2006, 74 pages.
IEEE 802.1ah-2008, "Virtual Bridged Local Area Networks, Amendment 7: Provider Backbone Bridges," Standard for Local and Metropolitan Area Networks, Institute of Electrical and Electronics Engineers, Inc. (IEEE), Aug. 14, 2008, 121 pages.
IEEE P802.1aq/D2.1, "Virtual Bridged Local Area Networks, Amendment 9: Shortest Path Bridging," Draft Standard for Local and Metropolitan Area Networks, Institute of Electrical and Electronics Engineers, Inc. (IEEE), Aug. 21, 2009, 208 pages.
IEEE P802.1AX-REV/D3.0, "Link Aggregation," Draft Standard for Local and Metropolitan Area Networks, Institute of Electrical and Electronics Engineers, Inc. (IEEE), Sep. 24, 2013, 312 pages.
IEEE P802.1AX-REV-D4.3, "Link Aggregation," Draft Standard for Local and Metropolitan Area Networks, Institute of Electrical and Electronics Engineers, Inc. (IEEE), Jul. 21, 2014, 320 pages.
IEEE P802.1AX-REV-D4.4b, "Link Aggregation," Draft Standard for Local and Metropolitan Area Networks, Institute of Electrical and Electronics Engineers, Inc. (IEEE), Aug. 31, 2014, 329 pages.
IEEE 802.1Q-2011, "Media Access Control (MAC) Bridges and Virtual Bridged Local Area Networks," Institute of Electrical and Electronics Engineers, Inc. (IEEE), Aug. 31, 2011, 1365 pages.
IEEE P802.1Q-REV/D1.0, "Media Access Control (MAC) Bridges and Virtual Bridged Local Area Networks," Draft Standard, Institute of Electrical and Electronics Engineers, Inc. (IEEE), Apr. 23, 2013, 1791 pages.
IEEE 802.11, "Part 11: Wireless LAN Medium Access Control (MAC) and Physical Layer (PHY) Specifications," Standard, Institute of Electrical and Electronics Engineers, Inc. (IEEE), Mar. 29, 2012, 2793 pages.
IEEE 802.3-2012, "IEEE Standard for Internet," Section One, 634 pages; Section Two, 780 pages; Section Three, 358 pages; Section Four, 732 pages; Section Five, 844 pages; Section Six, 400 pages; Institute of Electrical and Electronics Engineers, Inc.; Dec. 28, 2012.
ITU-T, G.870/Y.1352: Digital networks, Optical transport networks, Series Y: Global Information Infrastructure, Internet Protocol Aspects and Next-Generation Networks, Series G: Transmission Systems and Media, Digital Systems and Networks, Oct. 2012, 30 pages.
RFC: 768: Postel, "User Datagram Protocol," Network Working Group, Request for Comments, Aug. 28, 1980, 3 pages.
RFC 793: "Transmission Control Protocol, DARPA Internet Program Protocol Specification," Network Working Group, Request for Comments, Sep. 1981, 91 pages.
RFC 1058: Hedrick, "Routing Information Protocol," Network Working Group, Request for Comments, Jun. 1988, 33 pages.
RFC 1142: Oran, "OSI IS-IS Intra-domain Routing Protocol," Network Working Group, Request for Comments, Feb. 1990, 157 pages.
RFC 1180: Socolofsky, et al., "A TCP/IP Tutorial," Network Working Group, Request for Comments, Jan. 1991, 28 pages.
RFC 1321: Rivest, "The MD5 Message-Digest Algorithm," Network Working Group, Request for Comments, Apr. 1992, 20 pages.
RFC 2080: Malkin, et al., "RIPng for IPv6," Network Working Group, Request for Comments, Jan. 1997, 19 pages.
RFC 2205: Braden, et al., "Resource ReSerVation Protocol (RSVP)—Version 1 Functional Specification," Network Working Group, Request for Comments, Sep. 1997, 112 pages.
RFC 2210: Wroclawski, "The Use of RSVP with IETF Integrated Services," Network Working Group, Request for Comments, Sep. 1997, 33 pages.
RFC 2211: Wroclawski, "Specification of the Controlled-Load Network Element Service," Network Working Group, Request for Comments, Sep. 1997, 33 pages.

(56) References Cited

OTHER PUBLICATIONS

RFC 2212: Shenker, et al., "Specification of Guaranteed Quality of Service," Network Working Group, Request for Comments, Sep. 1997, 20 pages.
RFC 2328: Moy, "OSPF Version 2," Network Working Group, Request for Comments, The Internet Society, Apr. 1998, 244 pages.
RFC 2453: Malkin, "RIP Version 2," Network Working Group, Request for Comments, The Internet Society, Nov. 1998, 39 pages.
RFC 2460: Deering, et al., "Internet Protocol, Version 6 (IPv6) Specification," Network Working Group, Request for Comments, The Internet Society, Dec. 1998, 39 pages.
RFC 2474: Nichols, et al., "Definition of the Differentiated Services Field (DS Field) in the IPv4 and IPv6 Headers," Network Working Group, Request for Comments, The Internet Society, Dec. 1998, 20 pages.
RFC 2475: Blake, et al., "An Architecture for Differentiated Services," Network Working Group, Request for Comments, The Internet Society, Dec. 1998, 36 pages.
RFC 2597: Heinanen, et al., "Assured Forwarding PHB Group," Network Working Group, Request for Comments, The Internet Society, Jun. 1999, 11 pages.
RFC 2675: Borman, et al., "IPv6 Jumbograms," Network Working Group, Request for Comments, The Internet Society, Aug. 1999, 9 pages.
RFC 2983: Black, "Differentiated Services and Tunnels," Network Working Group, Request for Comments, The Internet Society, Oct. 2000, 14 pages.
RFC 3086: Nichols, et al., "Definition of Differentiated Services Per Domain Behaviors and Rules for their Specification," Network Working Group, Request for Comments, The Internet Society, Apr. 2001, 24 pages.
International Search Report and Written Opinion, Application No. PCT/IB2014/060915, dated Jul. 30, 2014, 13 pages.
International Search Report and Written Opinion, Application No. PCT/IB2014/060916, dated Jul. 31, 2014, 14 pages.
International Search Report and Written Opinion, Application No. PCT/IB2014/060912, dated Aug. 28, 2014, 13 pages.
International Search Report and Written Opinion, Application No. PCT/IB2014/060914, dated Aug. 27, 2014, 14 pages.
International Search Report and Written Opinion, Application No. PCT/IB2014/060913, dated Aug. 27, 2014, 14 pages.
"Draft Standard for Local and Metropolitan Area Networks—Link Aggregation; IEEE P802.1AX-REV/D1.0", IEEE Draft, 802-1AX-REV-D1-0, Feb. 1, 2013, pp. 1-190, vol. 802.1, No. d1-0, Institute of Electrical and Electronics Engineers, Inc., New York, NY, USA.
"Draft Standard for Local and Metropolitan Area Networks—Link Aggregation; IEEE P802.1AX-REV/D3.1", IEEE Draft, 802-1AX-REV-D3-1, Dec. 20, 2013, pp. 1-138, vol. 802.1, No. d3-1, Institute of Electrical and Electronics Engineers, Inc., New York, NY, USA.
"Draft Standard for Local and Metropolitan Area Networks—Link Aggregation; IEEE P802.1AX-REV/D3.1", IEEE Draft, 802-1AX-REV-D3-1, Dec. 20, 2013, pp. 139-317, vol. 802.1, No. d3-1, Institute of Electrical and Electronics Engineers, Inc., New York, NY, USA.
"IEEE Standard for Local and metropolitan area networks—Link Aggregation; IEEE Std 802.1AX-2008", IEEE Standard, Nov. 3, 2008, 162 pages, The Institute of Electrical and Electronics Engineers, Inc., New York, NY, USA.
Finn, "Diagrams to support ballots comments on 802.1AX-REV; axrev-nfinn-DRNI-diagrams-0312-v01", IEEE Draft, AXREV-NFINN-DRNI-Diagrams-0312-V01, Mar. 12, 2012, pp. 1-3, vol. 802.1, No. v01, IEEE-A, Piscataway, NJ, USA.
Haddock, "Rough Outline for a Intra-Portal Protocol Version 03", IEEE Draft; AXREV-HADDOCK-ROUGH-INTRA-PORTAL-PROTOCOL-0912-V03, Sep. 12, 2012, 12 pages, vol. 802.1, No. v03, IEEE-SA, Piscataway, NJ, USA.
Axrev-Haddock-Rought Intra-Portal-Protocol-0912-V03, Sep. 12, 2012, 12 pages, vol.802.1, No v03, IEEE-SA, Piscataway, NJ, USA.
International Search Report, Application No. PCT/SE2014/050177, dated Jul. 14, 2014, 4 pages.

Written Opinion, Application No. PCT/SE2014/050177, dated Jul. 14, 2014, 8 pages.
International Search Report, Application No. PCT/SE2014/050283, dated Jul. 21, 2014, 3 pages.
Written Opinion, Application No. PCT/SE2014/050283, dated Jul. 21, 2014, 6 pages.
International Search Report and Written Opinion, Application No. PCT/IB2014/060917, dated Jul. 22, 2014, 14 pages.
International Search Report and Written Opinion, Application No. PCT/SE2014/050282, dated Jul. 29, 2014, 11 pages.
"Link Aggregation", Draft Standard for Local and Metropolitan Area Networks, IEEE P802.1AX-REV™/D1.0, Feb. 1, 2013, 190 pages.
"Link Aggregation", Draft Standard for Local and Metropolitan Area Networks, IEEE P802.1AX-REV™/D0.5, Jan. 13, 2013, pp. 1-25, Institute of Electrical and Electronics Engineers, Inc., New York, NY, USA.
"Link Aggregation", Draft Standard for Local and Metropolitan Area Networks, IEEE P802.1AX-REV™/D0.5, Jan. 13, 2013, pp. 26-47, Institute of Electrical and Electronics Engineers, Inc., New York, NY, USA.
"Link Aggregation", Draft Standard for Local and Metropolitan Area Networks, IEEE P802.1AX-REV™/D0.5, Jan. 13, 2013, pp. 48-68, Institute of Electrical and Electronics Engineers, Inc., New York, NY, USA.
"Link Aggregation", Draft Standard for Local and Metropolitan Area Networks, IEEE P802.1AX-REV™/D0.5, Jan. 13, 2013, pp. 69-128, Institute of Electrical and Electronics Engineers, Inc., New York, NY, USA.
"Link Aggregation", Draft Standard for Local and Metropolitan Area Networks, IEEE P802.1AX-REV™/D0.5, Jan. 13, 2013, pp. 129-148, Institute of Electrical and Electronics Engineers, Inc., New York, NY, USA.
"Link Aggregation", Draft Standard for Local and Metropolitan Area Networks, IEEE P802.1AX-REV™/D0.5, Jan. 13, 2013, pp. 149-170, Institute of Electrical and Electronics Engineers, Inc., New York, NY, USA.
"Link Aggregation", Draft Standard for Local and Metropolitan Area Networks, IEEE P802.1AX-REV™/D0.5, Jan. 13, 2013, pp. 171-199, Institute of Electrical and Electronics Engineers, Inc., New York, NY, USA.
"Media Access Control (MAC) Bridges and Virtual Bridged Local Area Networks—Amendment 20: Shortest Path Bridging", IEEE Std 802.1aq—Jun. 29, 2012; 340 pages.
Ao, Ting, "Thinking on conversation-sensitive frame collection", IEEE Draft, AXREV-TINGA-LACP-EXTENSION-1112-VO, Nov. 11, 2012, pp. 1-14, vol. 802.1, No. VO, IEEE-SA, Piscataway, NJ, USA.
Saltsidis, Panagiotis, "802.1AX-REV—Link Aggregation Revision", Jul. 13, 2013, 17 pages, Joint IEEE-SA and ITU Workshop on Ethernet, Geneva, Switzerland.
"Link Aggregation", Draft Standard for Local and Metropolitan Area Networks, IEEE P802.1AX-REV™/D3.1, Dec. 20, 2013, 317 pages.
"Series G: Transmission Systems and Media, Digital Systems and Networks" Digital networks—Optical transport networks, Series Y: Global Information Infrastructure, Internet Protocol Aspects and Next-Generation Networks, ITU-T, G.870/Y.1352, Oct. 2012, 30 pages.
Final Office Action, U.S. Appl. No. 14/135,556, dated Jun. 16, 2016, 28 pages.
International Preliminary Report on Patentability (Chapter I), Application No. PCT/SE2014/050177, mailed May 19, 2016, 9 pages.
Communication Pursuant to Article 94(3) EPC for Application No. 14 724 800.9, mailed Apr. 22, 2016, 7 pages.
Nigel Bragg; "Split Brain Detection 1; axbq-bragg-split-brain-detection-0912-v00", IEEE Draft, vol. 802.1, No. v00, Sep. 6, 2012, pp. 1-8.
Non-Final Office Action, U.S. Appl. No. 14/134,966, dated Nov. 25, 2015, 18 pages.
Non-Final Office Action, U.S. Appl. No. 14/257,859, dated Dec. 7, 2015, 61 pages.

(56) References Cited

OTHER PUBLICATIONS

Non-Final Office Action, U.S. Appl. No. 14/257,769, dated Dec. 8, 2015, 28 pages.
Non-Final Office Action, U.S. Appl. No. 14/257,360, dated Jan. 13, 2016, 59 pages.
Yuehua, Wei, "Establish/Maintain a Portal and Distributed Relay," IEEE 802 plenary, San Antonio, Nov. 2012, 9 pages.
Non-Final Office Action, U.S. Appl. No. 14/257,252, dated Feb. 2, 2016, 41 pages.
IEEE P802.1AX-REV/D0.3, "Link Aggregation," Draft Standard for Local and Metropolitan Area Networks, Institute of Electrical and Electronics Engineers, Inc. (IEEE), Sep. 9, 2012, 183 pages.
Non-Final Office Action, U.S. Appl. No. 14/257,871, dated Mar. 16, 2016, 47 pages.
Non-Final Office Action, U.S. Appl. No. 14/257,637, dated Mar. 21, 2016, 44 pages.
First Written Opinion for Singapore Application No. 11201508361X, dated Jun. 29, 2016, 9 pages.
"Link Aggregation Control Protocol (LACP) (802.3ad) for Gigabit Interfaces", Cisco IOS Release 12.2(31)SB2, Mar. 1, 2007, pp. 1-18.
Notice of Allowance, U.S. Appl. No. 14/257,360, dated Jun. 27, 2016, 26 pages.
Final Office Action, U.S. Appl. No. 14/257,769, dated Apr. 26, 2016, 22 pages.
Notice of Allowance, U.S. Appl. No. 14/257,252, dated May 24, 2016, 11 pages.
Notice of Allowance, U.S. Appl. No. 14/257,859, dated Jul. 11, 2016, 34 pages.
Decision to Grant a Patent for Japan Application No. 2016-509579, mailed Nov. 30, 2016, 6 pages.
Patent Allowance for Korean Application No. 2015-7033235, mailed Nov. 16, 2016, 3 pages.
Notice of Allowance, U.S. Appl. No. 14/257,637, dated Jul. 20, 2016, 15 pages.
Notice of Allowance, U.S. Appl. No. 14/134,966, dated Jun. 17, 2016, 19 pages.
Final Office Action, U.S. Appl. No. 14/257,871, mailed Aug. 16, 2016, 42 pages.
Notice of Allowance, U.S. Appl. No. 14/135,556, mailed Sep. 1, 2016, 21 pages.
Notice of Allowance for Australia Application No. 2014259015, mailed Oct. 7, 2016, 3 pages.
Non-Final Office Action for Application No. 14/257,871, mailed Nov. 3, 2016, 25 pages.
Decision to Grant for Japan Application No. 2016-509581, mailed Nov. 14, 2016, 5 pages.
Notice of Allowance for U.S. Appl. No. 14/257,769, mailed Jan. 9, 2017, 37 pages.
Non-Final Office Action from U.S. Appl. No. 15/268,416 mailed Dec. 30, 2016, 30 pages.

* cited by examiner

METHOD AND SYSTEM OF SUPPORTING OPERATOR COMMANDS IN LINK AGGREGATION GROUP

CROSS-REFERENCE TO RELATED APPLICATIONS

This application claims priority to U.S. Provisional Patent Application No. 61/900,284, entitled "A Method and System of Supporting Operator Commands in Link Aggregation Group," filed on Nov. 5, 2013.

This application is related to U.S. Provisional Patent Application No. 61/815,200, entitled "A Method and System of Implementing Conversation-Sensitive Collection for a Link Aggregation Group," filed on Apr. 23, 2013, U.S. Provisional Patent Application No. 61/815,203, entitled "A Method and System of Updating Conversation Allocation in Link Aggregation," filed on Apr. 23, 2013, U.S. Provisional Patent Application No. 61/815,204, entitled "A Method and System of Implementing Distributed Resilient Network Interconnect for a Link Aggregation Group," filed on Apr. 23, 2013, U.S. Provisional Patent Application No. 61/839,022, entitled "A Method and System of Implementing Intra-Portal Link of Distributed Resilient Network Interconnect for a Link Aggregation Group," filed on Jun. 25, 2013, U.S. Patent Application No. 61/865,125, entitled "A Method and System of Updating Conversation Allocation in Link Aggregation," filed on Aug. 12, 2013, U.S. Provisional Patent Application No. 61/865,126, entitled "A Method and System of Implementing Distributed Resilient Network Interconnect for a Link Aggregation Group," filed on Aug. 12, 2013, U.S. Provisional Patent Application No. 61/902,518, entitled "A Method and System of Implementing Distributed Resilient Network Interconnect for a Link Aggregation Group," filed on Nov. 11, 2013, U.S. Provisional Patent Application No. 61/918,610, entitled "A Method and System of Implementing Distributed Resilient Network Interconnect for a Link Aggregation Group," filed on Dec. 19, 2013, U.S. patent application Ser. No. 14/134,966, entitled "A Method and System of Implementing Conversation-Sensitive Collection for a Link Aggregation Group," filed on Dec. 19, 2013, U.S. patent application Ser. No. 14/135,556, entitled "A Method and System of Updating Conversation Allocation in Link Aggregation," filed on Dec. 19, 2013, which are incorporated by reference herein in their entirety.

FIELD

The embodiments of the present invention generally relate to link aggregation, and more particularly relate to methods and apparatus for supporting operator commands in a Link Aggregation Group (LAG).

BACKGROUND

As illustrated in FIG. 1A, link aggregation is a network configuration and process used to aggregate multiple links between a pair of nodes 120, 122 in the network to enable transmission of user data on each of the links participating in a Link Aggregation Group (LAG) 101 (see, e.g., Institute of Electrical and Electronics Engineers (IEEE) standard 802.1AX). Aggregating multiple network connections in this fashion can increase throughput beyond what a single connection can sustain, and/or can be used to provide resiliency in case of a failure of one of the links. The "Distributed Resilient Network Interconnect" (DRNI) 102 (see Clause 9 of IEEE 802.1AX-REV/D3.1) specifies extensions to link aggregation in order to be able to use link aggregation on a network interface even between more than two nodes, for example between four nodes K, L, M and O as illustrated in FIG. 1B.

As shown in FIG. 1B, a LAG is formed between Network 150 and Network 152. More specifically, a LAG is formed between LAG virtual nodes or 'portals' 112, 114. The first LAG virtual node or portal 112 includes a first node (K) and a second node (L). The second LAG virtual node or portal 114 includes a third node (M) and a fourth node (O). These nodes can also be referred to as "Portal Systems." Note that both the first and second LAG virtual nodes or portals 112, 114 may include a single or more than two nodes in a portal. LAG Nodes K and M are connected as peer nodes, and LAG Nodes L and O are also connected as peer nodes. As used in this application, a "LAG virtual node" refers to a DRNI portal in the IEEE documentation discussed above (i.e., two or more nodes that appear as a single node to their respective peers). Additionally, the statement that virtual node or portal 112 "includes" two nodes K, L means that the virtual node or portal 112 is emulated by the nodes K, L, this can be referred to as an "emulated system." Similarly, the statement that virtual node or portal 114 "includes" two nodes M, O means that the virtual node or portal 114 is emulated by the nodes M, O. Note that link aggregation group 161 is also formed between K-M and L-O links.

Multiple nodes participating in the LAG appear to be the same virtual node or portal with a single System ID to their peering partner in the LAG. The System ID is used to identify each node (e.g., node K, node L, node M, and node O). The System ID is included in Link Aggregation Control Protocol Data Units (LACPDUs) sent between the individual partner nodes of the LAG (e.g., between K and M or between L and O). The System ID can be generated based on identifiers of the constituent nodes of a portal using any individual identifier or any combination thereof. A common and unique System ID for the corresponding LAG virtual node or portal can be consistently generated. Thus, as shown in FIG. 1B, node K and node L belong to the same Network 150 and they are part of the same DRNI Portal 112 (i.e., the same LAG virtual node), and use a common System ID of "K" for the emulated LAG virtual node 112. Similarly, Nodes M and O of Network 152 are seen as a single LAG virtual node or portal 114 with a System ID "M" by Nodes K and L.

FIG. 1B also shows the DRNI link allocation of a particular service (see bold link between K and M in FIG. 1B). The service allocation of an interface may involve a Virtual Local Area Network (VLAN), and an identifier for the service may be a VLAN Identifier (VID), such as a Service VID (i.e., "S-VID") (typically identifying services on Network to Network Interfaces (NNIs)), a Customer VID (i.e. "C-VID") (typically identifying services on User to Network Interfaces (UNIs)), a Backbone Service instance Identifier (i.e. "I-SID"), or any other service instance ID that identifies that specific service and could be decoded from the packet header. (Note that backbone VIDs are indistinguishable from S-VIDs as they have the same Ethertype.) In the example of FIG. 1B, the service is allocated to the upper link (between upper nodes K, M). The upper link is thus chosen as the "working" link and the lower link (between nodes L, O) is the "standby" link or "protection" link. Service link allocation, i.e. using the same physical link for frame transmission both in the forward and in the backward directions is highly desirable.

While FIG. 1B shows DRNI portals 112 and 114 each contain two nodes, DRNI portals are not so limited. Each portal may contain one to three nodes. FIG. 1C illustrates a DRNI in an alternate embodiment. Referring to FIG. 1C, link aggregation group 131 contains portal 142 (one network device 130) at one end, and portal 144 (two network devices 132 and 134) at the other end.

Service providers utilize various embodiments of link aggregation groups (such as illustrated in FIGS. 1A-C and other alternate DRNI systems) to provide services. Service providers may have the need to perform maintenance tasks. For maintenance tasks, standard body such as International Telecommunication Union (ITU) has defined a set of operator commands in ITU-T (Telecommunication Standardization Sector of ITU) G.870/Y1352, Section 3.2. The focus on the automatic reconfiguration and the accommodation of differing capabilities and constraints as two of the main design principles in the development of the original Link Aggregation operation makes the support of coordinated operator commands on the devices participating in a Link Aggregation Group a challenge.

SUMMARY

A method is disclosed that is to be executed for supporting operator commands in a link aggregation group at a node/portal (e.g., a network device), where the node/portal is communicatively coupled with aggregation ports through links of the link aggregation group to a remote network device, where the node/portal processes conversations, and where each conversation contains an ordered sequence of frames. The method starts with receiving a local operator command for changing aggregation port priority of the link aggregation group, where the local operator command contains operator command attributes including an operator command aggregation port prioritized list for the link aggregation group, and where the operator command aggregation port prioritized list indicates desired priorities of ports for conversations carried in the link aggregation group. The method continues with determining that the operator command aggregation port prioritized list is different from a remote aggregation port prioritized list used at the remote network device. The node/portal then transmits a set of operator command attributes associated with the local operator command to the remote node/portal, the set of operator command attributes including at least the operator command aggregation port prioritized list, and performs the local operator command by setting a local aggregation port prioritized list to be consistent with the operator command aggregation port prioritized list for the link aggregation group, where the local aggregation port prioritized list indicates priorities of ports for conversations carried in the link aggregation group.

While the method above applies to the node/portal receiving an operator command, another method is disclosed at a node/portal (e.g., a network device) not receiving the operator command, where the node/portal is communicatively coupled with aggregation ports through links of the link aggregation group to a remote network device, where the node/portal processes conversations, and where each conversation contains an ordered sequence of frames. The method starts with receiving a set of operator command attributes from the remote network device. The node/portal then determines that the node/portal serves a slave role of the link aggregation group. The node/portal then sets a local aggregation port prioritized list to be consistent with the received set of operator command attributes, where the local aggregation port prioritized list indicates priorities of ports for conversations carried in the link aggregation group. The node/portal then sends an acknowledgment to the remote node/portal after the local aggregation port prioritized list is set to be consistent with the received set of operator command attributes.

A network device for supporting operator commands is disclosed. The network device is configured to be communicatively coupled with aggregation ports through links of a link aggregation group to a remote network device, where the network device processes conversation, and where each conversation contains an ordered sequence of frames. The network device contains a network processor and a set of aggregated ports configured to transmit and receive frames over the link of the link aggregation group. The network processor includes an operator command interface and an aggregation controller. The operator command interface is configured to receive a local operator command for changing aggregation port priority of the link aggregation group, where the local operator command contains operator command attributes including an operator command aggregation port prioritized list for the link aggregation group, and where the operator command aggregation port prioritized list indicates desired priorities of ports for conversations carried in the link aggregation group. The aggregation controller is configured to determine that the operator command aggregation port prioritized list is different from a remote aggregation port prioritized list used at the remote network device, and it is configured to cause the set of aggregation port to transmit a set of the operator command attributes associated with the local operator command to the remote network device, the set of operator command attributes including at least the operator command aggregation port prioritized list, and it is further configured to perform the local operator command by setting a local aggregation port prioritized list to be consistent with the operator command aggregation port prioritized list for the link aggregation group, wherein the local aggregation port prioritized list indicates priorities of ports for conversations carried in the link aggregation group.

While the network device disclosed above receiving the operator command, another network device for supporting operator commands while not receiving the operator command is also disclosed. The network device is configured to be communicatively coupled with aggregation ports through links of a link aggregation group to a remote network device, where the network device processes conversation, and where each conversation contains an ordered sequence of frames. The network device contains a network processor and a set of aggregation ports configured to receive frames over the link of the link aggregation group, where the frames contain a set of operator command attributes from the remote network device, and where is associated with an operator command. The network processor includes an aggregation controller. The aggregation controller is configured to determine that the network device serves a slave role of the link aggregation group, and it is configured to set a local aggregation port prioritized list to be consistent with the received set of operator command attributes, where the local aggregation port prioritized list indicates priorities of ports for conversations carried in the link aggregation group, and it is further configured to send an acknowledgment to the remote network device after the local aggregation port prioritized list is set to be consistent with the received set of operator command attributes.

A non-transitory machine-readable storage medium has instructions stored therein which when executed by a processor, causes the processor to perform operations for supporting operator commands in a link aggregation group at a network device, where the node/portal is communicatively coupled with aggregation ports through links of the link aggregation group to a remote network device, where the node/portal processes conversations, and where each conversation contains an ordered sequence of frames. The operations start with receiving a local operator command for changing aggregation port priority of the link aggregation group, where the local operator command contains operator command attributes including an operator command aggregation port prioritized list for the link aggregation group, and where the operator command aggregation port prioritized list indicates desired priorities of ports for conversations carried in the link aggregation group. The operations continue with determining that the operator command aggregation port prioritized list is different from a remote aggregation port prioritized list used at the remote network device. The node/portal then transmits a set of the operator command attributes associated with the local operator command to the remote node/portal and performs the local operator command by setting a local aggregation port prioritized list to be consistent with the operator command aggregation port prioritized list for the link aggregation group, where the local aggregation port prioritized list indicates priorities of ports for conversations carried in the link aggregation group.

A non-transitory machine-readable storage medium has instructions stored therein which when executed by a processor, causes the processor to perform operations for supporting operator commands in a link aggregation group at a network device, where the node/portal (e.g., a network device) is communicatively coupled with aggregation ports through links of the link aggregation group to a remote network device, where the node/portal processes conversations, and where each conversation contains an ordered sequence of frames. The operations start with receiving a set of operator command attributes from the remote network device. The node/portal then determines that the node/portal serves a slave role of the link aggregation group. The node/portal then sets a local aggregation port prioritized list to be consistent with the received set of operator command attributes, where the local aggregation port prioritized list indicates priorities of ports for conversations carried in the link aggregation group. The node/portal then sends an acknowledgment to the remote node/portal after the local aggregation port prioritized list is set to be consistent with the received set of operator command attributes.

Embodiments of the invention provide mechanisms to perform operator commands in link aggregation group so that frame ordering for sequences of frame exchanges can be maintained through the network devices upon operator commands being performed. Embodiments of the invention additionally synchronize both sides of link aggregation groups when an operator command requires acknowledgement from the other side.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
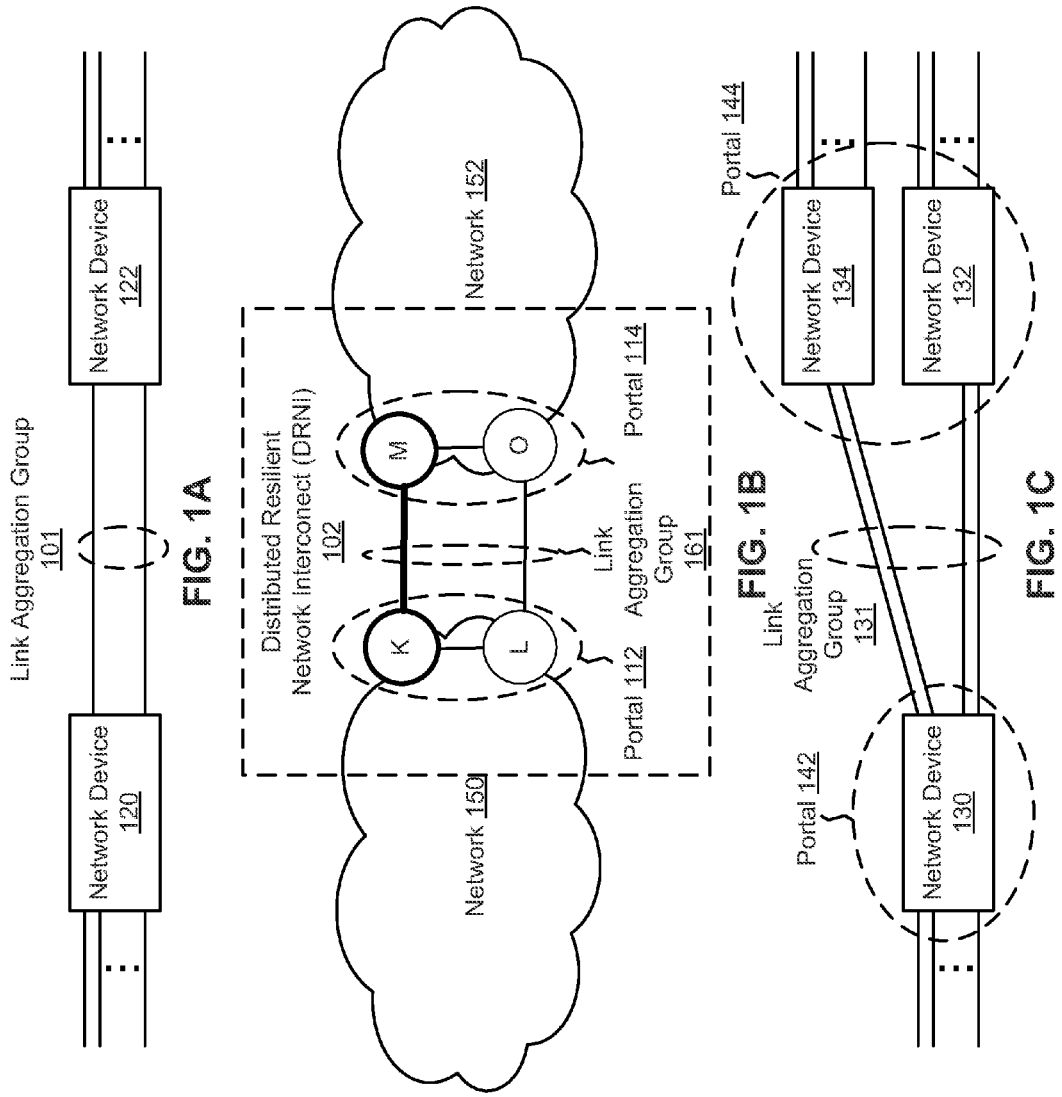
FIGS. 1A-C are diagrams of embodiments of a Link Aggregation Groups between two network devices and between portals.

In the following description, numerous specific details are set forth. However, it is understood that embodiments of the invention may be practiced without these specific details. In other instances, well-known circuits, structures and techniques have not been shown in detail in order not to obscure the understanding of this description.

It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Terms

The following terms may be used in the description.

Actor: The local entity (i.e., node or network device) in a Link Aggregation Control Protocol (LACP) exchange. Note local node/portal (or network device) and actor node/portal (or network device) are used interchangeably in the specification.

Aggregation Key: A parameter associated with each Aggregation Port and with each Aggregator of an Aggregation System identifying those Aggregation Ports that can be aggregated together. Aggregation Ports in an Aggregation System that share the same Aggregation Key value are potentially able to aggregate together.

Aggregation Port: A Service Access Point (SAP) in an Aggregation System that is supported by an Aggregator.

Aggregation System: A uniquely identifiable entity comprising (among other things) an arbitrary grouping of one or more aggregation ports for the purpose of aggregation. An instance of an aggregated link always occurs between two aggregation systems. A physical device may comprise a single aggregation system or more than one aggregation system.

Aggregation Client: The layered entity immediately above the Link Aggregation Sublayer, for which the Link Aggregation Sublayer provides an instance of the Internal Sublayer Services (ISS).

Aggregator: A logical media access control (MAC) address, bound to one or more Aggregation Ports through which the Aggregator Client is provided access to the physical media.

Conversation: A set of frames transmitted from one end station to another, where all the frames form an ordered sequence, and where the communicating end stations require the ordering to be maintained among the set of frames exchanged.

Data Terminal Equipment (DTE): Any source or destination of data connected to the local area network.

Distributed Relay (DR): A functional entity, distributed over a Portal by a DR Function in each of the Aggregation Systems comprising a Portal, which distributes outgoing frames from Gateways to Aggregators, and distributes incoming frames from Aggregators to Gateways.

Distributed Resilient Network Interconnect (DRNI): Link Aggregation expanded to include either a Portal and an Aggregation System, or two Portals.

DR Function: The part of a Distributed Relay residing within a single Portal System.

Gateway: A connection, typically virtual (not a physical link between systems) connecting a Distributed Relay to a System, consisting of a Gateway Link and two Gateway Ports.

Internal Sublayer Service (ISS): An augmented version of the MAC service, defined in IEEE Std 802.1AC-2012.

Link Aggregation Group (LAG): A group of links that appear to an Aggregator Client as if they were a single link. A Link Aggregation Group can connect two Aggregation Systems, an Aggregation System and a Portal, or two Portals. One or more conversations may be associated with each link that is part of a Link Aggregation Group.

Partner: The remote entity (i.e., node or network device) in a Link Aggregation Control Protocol exchange. Note remote node/portal (or network device) and partner node/portal (or network device) are used interchangeably in the specification.

Port conversation identifier (ID): A conversation identifier value that is used to select frames passing through an Aggregation Port.

Portal: One end of a DRNI; including one or more Aggregation Systems, each with physical links that together comprise a Link Aggregation Group. The Portal's Aggregation Systems cooperate to emulate the presence of a single Aggregation System to which the entire Link Aggregation Group is attached.

Type/Length/Value (TLV): A short, variable length encoding of an information element consisting of sequential type, length, and value fields where the type field identifies the type of information, the length field indicates the length of the information field in octets, and the value field contains the information itself. The type value is locally defined and needs to be unique within the protocol defined in this standard.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

An electronic device (e.g., an end station, a network device) stores and transmits (internally and/or with other electronic devices over a network) code (composed of software instructions) and data using machine-readable media, such as non-transitory machine-readable media (e.g., machine-readable storage media such as magnetic disks; optical disks; read only memory; flash memory devices; phase change memory) and transitory machine-readable transmission media (e.g., electrical, optical, acoustical or other form of propagated signals—such as carrier waves, infrared signals). In addition, such electronic devices include hardware, such as a set of one or more processors coupled to one or more other components—e.g., one or more non-transitory machine-readable storage media (to store code and/or data) and network connections (to transmit code and/or data using propagating signals), as well as user input/output devices (e.g., a keyboard, a touchscreen, and/or a display) in some cases. The coupling of the set of processors and other components is typically through one or more interconnects within the electronic devices (e.g., busses and possibly bridges). Thus, a non-transitory machine-readable medium of a given electronic device typically stores instructions for execution on one or more processors of that electronic device to execute operations of embodiments of the invention as detailed herein below. One or more parts of an embodiment of the invention may be implemented using different combinations of software, firmware, and/or hardware.

As used herein, a network device (e.g., a router, switch, bridge) is a piece of networking equipment, including hardware and software, which communicatively interconnects other equipment on the network (e.g., other network devices, end stations). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer-to-peer (P2P) service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network devices, which are coupled (e.g., through one or more core network devices) to other edge network devices, which are coupled to other end stations (e.g., server end stations).

Network devices are commonly separated into a control plane and a data plane (sometimes referred to as a forwarding plane or a media plane). In the case that the network device is a router (or is implementing routing functionality), the control plane typically determines how data (e.g., packets) is to be routed (e.g., the next hop for the data and the outgoing port for that data), and the data plane is in charge of forwarding that data. For example, the control plane typically includes one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other network devices to exchange routes and select those routes based on one or more routing metrics. In addition, the control plane also typically include ISO layer 2 control protocols such as Rapid Spanning Tree Protocol (RSTP), Multiple Spanning Tree Protocol (MSTP), and SPB (Shortest Path Bridging), which have been standardized by various standard bodies (e.g., SPB has been defined in IEEE Std 802.1aq-2012).

Routes and adjacencies are stored in one or more routing structures (e.g., Routing Information Base (RIB), Label Information Base (LIB), one or more adjacency structures) on the control plane. The control plane programs the data plane with information (e.g., adjacency and route information) based on the routing structure(s). For example, the control plane programs the adjacency and route information into one or more forwarding structures (e.g., Forwarding Information Base (FIB), Label Forwarding Information Base (LFIB), and one or more adjacency structures) on the data plane. The data plane uses these forwarding and adjacency structures when forwarding traffic.

Each of the routing protocols downloads route entries to a main RIB based on certain route metrics (the metrics can be different for different routing protocols). Each of the routing protocols can store the route entries, including the route entries which are not downloaded to the main RIB, in a local RIB (e.g., an OSPF local RIB). A RIB module that manages the main RIB selects routes from the routes downloaded by the routing protocols (based on a set of metrics) and downloads those selected routes (sometimes referred to as active route entries) to the data plane. The RIB module can also cause routes to be redistributed between routing protocols. For layer 2 forwarding, the network device can store one or more bridging tables that are used to forward data based on the layer 2 information in that data.

Typically, a network device includes a set of one or more line cards, a set of one or more control cards, and optionally a set of one or more service cards (sometimes referred to as resource cards). These cards are coupled together through one or more interconnect mechanisms (e.g., a first full mesh coupling the line cards and a second full mesh coupling all of the cards). The set of line cards make up the data plane, while the set of control cards provide the control plane and exchange packets with external network devices through the line cards. The set of service cards can provide specialized processing (e.g., Layer 4 to Layer 7 services (e.g., firewall, Internet Protocol Security (IPsec) (RFC 4301 and 4309), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms.

As used herein, a node forwards IP packets on the basis of some of the IP header information in the IP packet; where IP header information includes source IP address, destination IP address, source port, destination port (where "source port" and "destination port" refer herein to protocol ports, as opposed to physical ports of a network device), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317). Nodes are implemented in network devices. A physical node is implemented directly on the network device, whereas a virtual node is a software, and possibly hardware, abstraction implemented on the network device. Thus, multiple virtual nodes may be implemented on a single network device.

A network interface may be physical or virtual; and an interface address is an IP address assigned to a network interface, be it a physical network interface or virtual network interface. A physical network interface is hardware in a network device through which a network connection is made (e.g., wirelessly through a wireless network interface controller (WNIC) or through plugging in a cable to a port connected to a network interface controller (NIC)). Typically, a network device has multiple physical network interfaces. A virtual network interface may be associated with a physical network interface, with another virtual interface, or stand on its own (e.g., a loopback interface, a point to point protocol interface). A network interface (physical or virtual) may be numbered (a network interface with an IP address) or unnumbered (a network interface without an IP address). A loopback interface (and its loopback address) is a specific type of virtual network interface (and IP address) of a node (physical or virtual) often used for management purposes; where such an IP address is referred to as the nodal loopback address. The IP address(es) assigned to the network interface(s) of a network device, are referred to as IP addresses of that network device; at a more granular level, the IP address(es) assigned to network interface(s) assigned to a node implemented on a network device, can be referred to as IP addresses of that node.

Some network devices provide support for implementing VPNs (Virtual Private Networks) (e.g., Layer 2 VPNs and/or Layer 3 VPNs). For example, the network device where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other network devices). Layer 2 circuits are configured between the CEs and PEs (e.g., an Ethernet port, an ATM permanent virtual circuit (PVC), a Frame Relay PVC). In a Layer 3 VPN, routing typically is performed by the PEs. By way of example, an edge network device that supports multiple contexts may be deployed as a PE; and a context may be configured with a VPN protocol, and thus that context is referred as a VPN context.

Some network devices provide support for VPLS (Virtual Private LAN Service) (RFC 4761 and 4762). For example, in a VPLS network, subscriber end stations access content/ services provided through the VPLS network by coupling to CEs, which are coupled through PEs coupled by other network devices. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow subscriber end stations that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

Network devices can also support native L2 network technologies and device types including VLAN bridged networks supported by C-VLAN bridges, provider bridges, provider backbone bridges, provider backbone bridges-traffic engineering (TE) (as defined in IEEE std 802.1ad-2005, IEEE std 802.1ah-2008, IEEE std 802.1aq/D2.1, IEEE std 802.1Q-2011) and similar technologies and network device types. The above listing of network device types and supported technologies is provided by way of example and not limitation. One skilled in the art would understand that other technologies, standards and device types can be included as network devices as used herein.

Link Aggregation Sublayer

Figure 2:
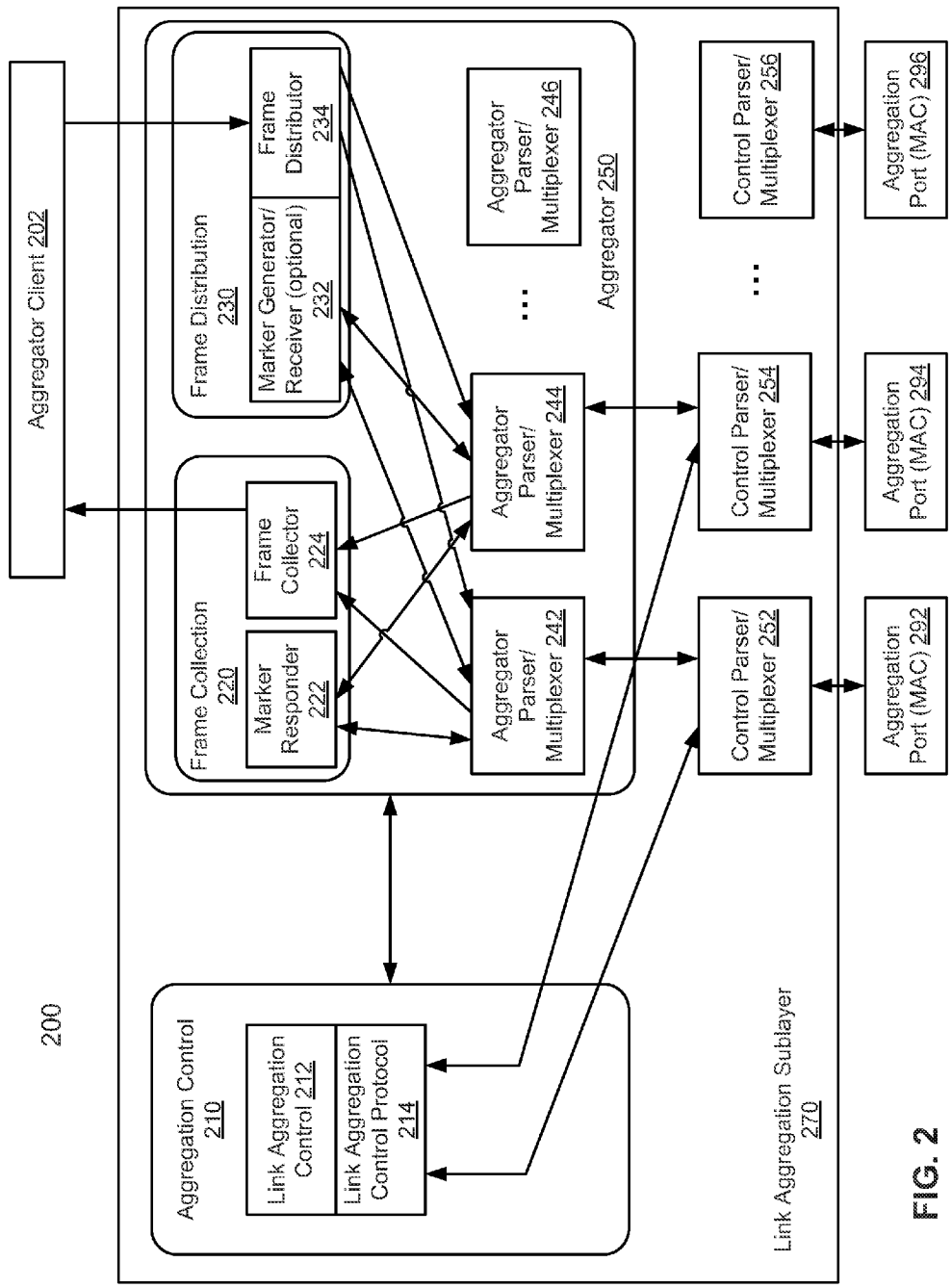
FIG. 2 is a diagram of one embodiment of a Link Aggregation Sublayer.

FIG. 2 is a diagram of one embodiment of Link Aggregation Sublayer 200. Aggregator client 202 communicates with a set of aggregation ports 292, 294, 296 through aggregator 250. In one embodiment, aggregator 250 presents a standard IEEE Std 802.1Q Internal Sublayer Service (ISS) interface to aggregator client 202. Aggregator 250 binds to one or more aggregation ports including aggregation Ports 292, 294, 296. Aggregator 250 distributes frame transmissions from aggregator client 202 to aggregation Ports 292, 294, 296, and to collect received frames from aggregation Ports 292, 294, 296 and pass them to aggregator client 202 transparently.

The binding of aggregation ports 292, 294, 296 to aggregator 250 is managed by link aggregation control 210, which is responsible for determining which links can be aggregated, aggregating them, binding aggregation ports to an appropriate aggregator, and monitoring conditions to determine when a change in aggregation is needed. Such determination and binding can be under manual control through direct manipulation of the state variables of link aggregation (e.g., through aggregation keys) by a network manager. In addition, automatic determination, configuration, binding, and monitoring may occur through the use of Link Aggregation Control Protocol (LACP) 214. LACP 214 uses peer exchanges across the links to determine, on an ongoing basis, the aggregation capability of the various links, and continuously provides the maximum level of aggregation capability achievable between a given pair of Aggregation Systems.

An Aggregation System can contain multiple aggregators, serving multiple aggregator clients. A given aggregation port will bind to (at most) a single aggregator at any time. An aggregator client is served by a single aggregator at a time.

Frame ordering is maintained for certain sequences of frame exchanges between aggregator clients (known as conversations). Frame distributor 234 ensures that all frames of a given conversation are passed to a single aggregation port. For a given conversation, frame collector 224 is required to pass frames to aggregator client 202 in the order that they are received from the aggregation port. Frame collector 224 is otherwise free to select frames received from aggregation ports 292, 294, 296 in any order. Since there are no means for frames to be misordered on a single link, this ensures that frame ordering is maintained for any conversation. Conversations can be moved among aggregation ports within a Link Aggregation Group, both for load balancing and to maintaining availability in the event of link failures.

Aggregation ports 292, 294, 296 are each assigned media access control (MAC) addresses, which are unique over the Link Aggregation Group and to any bridged local area network (LAN) (e.g., one complying with IEEE 802.1Q Bridged LAN) to which the Link Aggregation Group is connected. These MAC addresses are used as the source addresses for frame exchanges that are initiated by entities within Link Aggregation Sublayer 270 itself (i.e., LACP 214 and Marker protocol exchanges).

Aggregator 250 (and other aggregators if deployed) is assigned a MAC address, unique over the Link Aggregation Group and to bridged LAN (e.g., one complying with IEEE 802.1Q Bridged LAN) to which the Link Aggregation Group is connected. This address is used as the MAC address of the Link Aggregation Group from the perspective of the aggregator client 202, both as a source address for transmitted frames and as the destination address for received frames. The MAC address of aggregator 250 may be one of the MAC addresses of an aggregation port in the associated Link Aggregation Group.

Distributed Resilient Network Interconnect (DRNI)

Link aggregation creates a Link Aggregation Group that is a collection of one or more physical links that appears, to higher layers, to be a single logical link. The Link Aggregation Group has two ends, each terminating in an Aggregation System. DRNI expands the concept of link aggregation so that, at either or both ends of a link aggregation group, the single Aggregation System is replaced by a Portal, each composed from one or more Aggregation Systems.

DRNI is created by using a distributed relay to interconnect two or more systems, each running link aggregation, to create a Portal. Each Aggregation System in the Portal (i.e., each Portal System) runs link aggregation with a single aggregator. The distributed relay enables the Portal Systems to jointly terminate a Link Aggregation Group. To all other Aggregation Systems to which the Portal is connected, the Link Aggregation Group appears to terminate in a separate emulated Aggregation System created by the Portal Systems.

Operator Commands

Service providers often provide protection/redundancy in its network architecture. Protection/redundancy makes data traffic more robust and make the network easier to maintain. Generally the following protection schemes are offered: 1+1, 1:n (n≥1), and (1:1)″ protection architectures.

In a 1+1 protection architecture, traffic is bridged to both working and protection transport paths at the source end, while at the sink end, the traffic is selected from the two paths (e.g., from the better signal of the two paths). Because traffic is bridged to both paths, 1+1 protection architecture does not allow unprotected extra traffic to be carried. In a 1:n protection architecture, at the source end, traffic is either permanently transmitted on the working path and may be transmitted to the protection path (in the case of a broadcast bridge), or is transmitted to either its working or protection path (in the case of a selector bridge). At the sink end, the traffic is selected from either the working or the protection path. An unprotected extra traffic can be transmitted via the protection path, whenever the protection path is not used to carry normal traffic. In a (1:1)″ protection architectures, n traffic signals share n working and protection paths. It may have an extra traffic signal, in which case an additional protection path will be present.

In maintenance, a service provider may issue various operator commands to switch traffic between working/protection paths, add extra traffic on a protection path, prohibit switch on a path, etc. Standardization bodies have proposed various sets of operator commands. A set of operator commands proposed by ITU-T G.870/Y1352 (referred to as "ITU-T operator commands") is discussed herein below as an example. However, embodiments of the invention apply to other sets of operator commands.

The set of ITU-T operator commands includes the following:

Forced switch: A switch action switches a normal traffic signal between working transport and protection transport entities, unless an equal or higher priority switch command is in effect.

Manual switch: A switch action switches a normal traffic signal between working transport and protection transport entities, unless an equal or higher priority switch command is in effect. Manual switch has a lower priority than forced switch.

Lockout: A temporary configuration action to prohibit protection on a normal traffic signal or through a protection transport entity.

Exercise: A check for a normal traffic signal to see responses on protection switch protocol, unless the protection transport entity is in use.

Freeze: A temporary configured action to prevent any switch action to be taken.

Clear: An action to clear lockout, forced switch, manual switch, exercise command.

Note a given system may deploy more or less operator commands included above, and the list is not meant to be an exhaustive list of operator commands. In addition, some commands have parameters making the commands perform different operations at working transport and protection transport entities.

A protection switch operator command such as forced switch or manual switch may be revertive or non-revertive. With a revertive switch command, the normal traffic signal returns to or remains on the working transport entity if the switch requests are terminated. Generally, a revertive switch command is associated with a wait-to-restore (WTR) timer, and the normal traffic signal returns if the switch requests have been terminated for the duration of the WTR timer. In the contrary, with a non-revertive switch command, the normal traffic signal does not return to the working transport entity if the switch requests are terminated.

Operator Commands in Link Aggregation Group (LAG)

When a service provider utilizes link aggregation groups as illustrated in FIGS. 1A-C, it may also provide protection. For example, in a singular LAG connection, certain ports individually or in combination may be designated as working transport entities while others are designated as protection transport entities. Similarly, some portals or ports within a portal may be designated as working transport entities while others are designated as protection transport entities. The behaviors of working and protection transport entities are coordinated not only between the transport entities at one end of the LAG, but also between local and partner nodes/portals.

In a traditional point-to-point communication link without LAG, operator commands are often communicated between source and sink ends through an automatic protection switch (APS) protocol, which exchange signal bits between two ends to trigger changes on the other end. According to embodiments of the present disclosure operator commands may be communicated using other ways. Operator commands initiated at a local node/portal may trigger changes to its (remote) partner node/portal in one of or a combination of the following ways:

1) Using management plane of a system including the LAG. The management plane includes externally controlled operations such as software defined networking (SDN) based operations (e.g., one standardized by open networking foundation (ONF)), or network function virtualization (NFV) based operations.

2) Using operations, administration, and management (OAM) tools—the operations can be seen as a part of an OAM toolbox. For simple switch cases such as manual switch, provider backbone bridge traffic engineering (PBB-TE) continuity check message (CCM) methods can be used, and for more involved cases, traditional APS protocols could be used.

3) Using a control protocol defined explicitly for operator command signaling.

For traffic to transmit successfully through a LAG, local and partner nodes/portals should agree on what port(s) act as working and protection transport entities respectively. The synchronization of working and protection transport entities may be achieved through synchronization of prioritized port distribution lists between local and partner nodes/portals. Prioritized port distribution list of a node/portal is a list of aggregation ports in the node/portal, in priority order (e.g., from the most desired to the least desired), for carrying an indexed port conversation identifier.

In one embodiment, the prioritized port distribution lists for a node/portal is represented by a variable in the form of an array of lists, here called aAggConversationAdminPort[ ]. The variable aAggConversationAdminPort[ ] is an array of e.g. 4096 lists, indexed by port conversation identifier (ID), determining which aggregation port in the node/portal carries which port conversation ID. Each item in the array is a list of aggregation ports in this node/portal, arranged in priority order from the most desired to the least desired, for carrying the indexed port conversation ID. This variable provides the locally administrated service (by an administrator) to aggregation port prioritized list.

Figure 3:
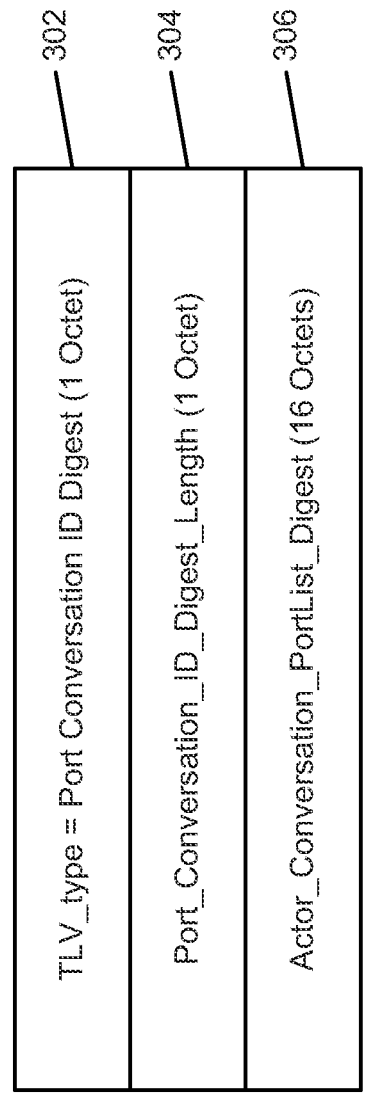
FIG. 3 illustrates a TLV structure carrying such digest according to one embodiment of the invention.

In one embodiment, the variable representing the prioritized port distribution list for a node/portal may be compressed to a digest. For example, aAggConversationAdmin- Port[ ] may be compressed by using MD5 digest (a 16-octet MD5 fingerprint (see IETF RFC 1321 (1992)) created from the aAggConversationAdminPort[ ]) to form a conversation port list digest. FIG. 3 illustrates a TLV structure carrying such digest according to one embodiment of the invention. Referring to FIG. 3, the 1 octet field 302 indicates the nature of the information carried in the TLV-tuple. In one embodiment, the port conversation identifier (ID) digest TLV is identified by the integer value 0x05. The 1 octet field 304 indicates the length in octets of this TLV-tuple. The port conversation ID digest TLV uses a length value of 18 (0x12). The 16 octets field 306 contains the value of the MD5 digest computed from aAggConverstationAdminPort[ ] for exchange with the partner node/portal. While the local node/portal sends over its port conversation ID digest (referred to as variable Actor_Conversation_PortList_Digest in one embodiment), it also stores received partner's conversation ID digest. In one embodiment, the variable is referred to as Partner_Conversation_PortList_Digest, which stores the last received digest of the partner node/portal's prioritized conversation ID-to-aggregation port assignment. When the two end of a LAG is in full agreement, the partner node/portal's prioritized port distribution list should be the same, thus, the two digests, Actor_Conversation_PortList_Digest and Partner_Conversation_PortList_Digest should be consistent. In one embodiment, the result of the comparison of the two digests is stored in a separate variable, which is referred to as Diff_Port_Conversation_Digests. Differ_Port_Conversation_Digests is a Boolean value indicating that the conversation digests used by nodes/portals at two ends of a LAG is different.

During normal operation, the administrator of the local node/portal may decide to change its local prioritized port distribution list through issuing an operator command, for the operator command to perform successfully, the change of the local prioritized port distribution list needs to be communicated to its remote partner node/portal and trigger further operations at the remote partner node/portal. Embodiments of the invention support such communication and trigger operations at the remote partner node/portal.

Methods of Supporting Operator Commands at Receiving LAG Node/Portal

Figure 4:
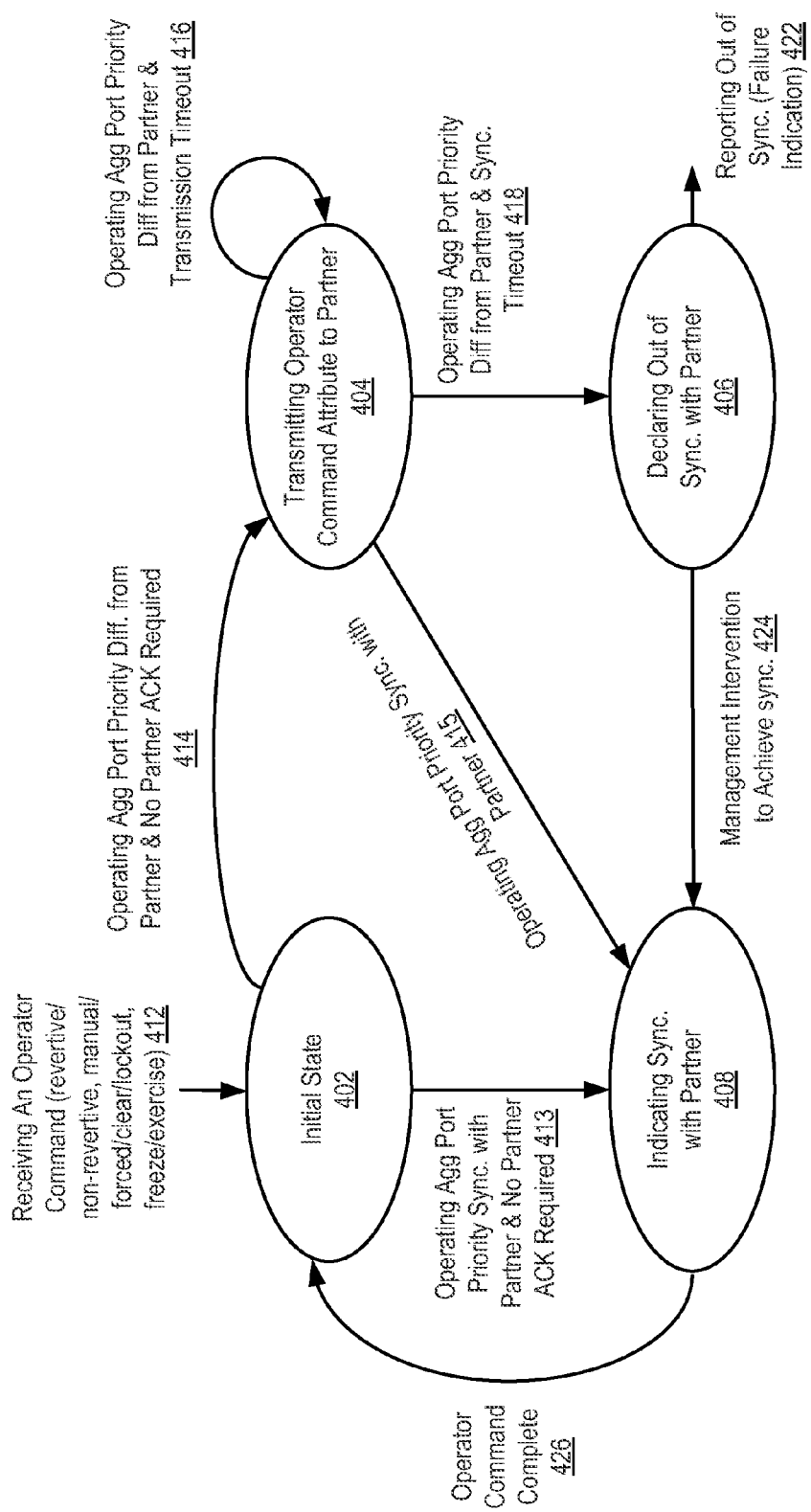
FIG. 4 illustrates methods of supporting operator commands not requiring acknowledgment at a LAG node/portal receiving the operator commands according to one embodiment of the invention.

FIG. 4 illustrates methods of supporting operator commands not requiring acknowledgment at a LAG node/portal receiving the operator commands according to one embodiment of the invention. The state machine is implemented at a LAG node/portal as illustrated in FIGS. 1A-C. The node/portal is at initial state 402 where the local aggregation port prioritized list is synchronized with its partner aggregation port prioritized list. Then the local node/portal receives an operator command at 412. The operator command can be one of manual, forced, clear, lockout, freeze, or exercise for example. The operator command contains operator command attributes (e.g., revertive, non-revertive), and the operator command attributes includes an operator command aggregation port prioritized list for the LAG. The local node/portal checks the operator command aggregation port prioritized list associated with the operator command. If the operator command aggregation port prioritized list is synchronized with that of the partner node/portal (thus partner and the local node/portal being synchronized), and the operator command does not require acknowledgement from the partner node/portal as determined at reference 413, the state machine goes to reference 408, where it indicates that partner is in synchronization with the local node/portal and the operator command is performed at the local node/portal.

If the operator command aggregation port prioritized list is different from that of the partner node/portal, and the operator command does not require acknowledgement from the partner node/portal as determined at reference 414, the state machine goes to reference 404, where the local node/portal transmits the operator command aggregation port prioritized list to partner node/portal. Once the operator command aggregation port prioritized list is transmitted, the operator command may be performed at the local node/portal as the operator command does not require acknowledgement from the partner node/portal. Note the determination of the operator command aggregation port prioritized list being different from that of the partner node/portal is based on a received partner node/portal aggregation port prioritized list in one embodiment, for example, through a variable such as Partner_Conversation_PortList_Digest.

The transmission is associated with a transmission timeout timer. At state 404, if the operator command aggregation port prioritized list stays different from that of the partner node/portal and the timeout timer expires, at reference 416, the transmission is repeated. The transmission may be repeated several times as long as the operator command aggregation port prioritized list is different from that of the partner node/portal and a synchronization timeout timer has not expired as determined at reference 418. Once that happens, the state machine goes to reference 406, where the local node/portal declare out of synchronization, and a report (e.g., a failure indication) is sent out to a management interface at reference 422. At reference 424, management may intervene and achieve synchronization so the state machine goes back to reference 408. Alternatively, the state machine may transfer from reference 404 to reference 408, if the local node/portal determines that the operator command aggregation port prioritized list is synchronized with the partner node/portal aggregation port prioritized list at reference 415. Once the state machine reaches synchronization and the operator command is performed at reference 426, the state machine returns to initial state 402.

Note the transmitting of the operator command aggregation port prioritized list may be through one of the three ways discussed herein above, namely, through using management plane commands, OAM tools, or a new control protocol.

Figure 5:
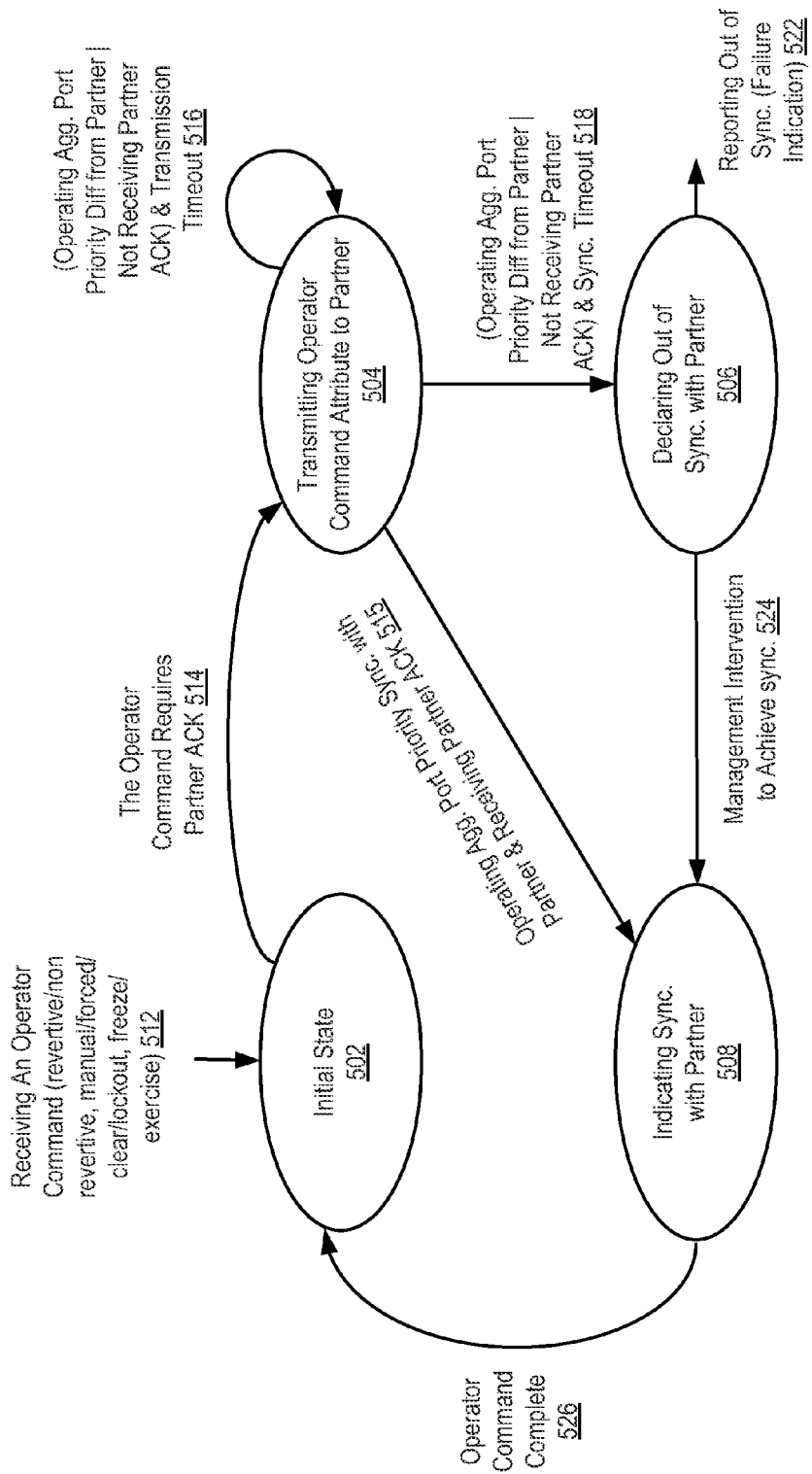
FIG. 5 illustrates methods of supporting operator commands requiring acknowledgment at a LAG node/portal receiving the operator commands according to one embodiment of the invention.

FIG. 5 illustrates methods of supporting operator commands requiring acknowledgment at a LAG node/portal receiving the operator commands according to one embodiment of the invention. The state machine is implemented at a LAG node/portal as illustrated in FIGS. 1A-C. The node/portal is at initial state 502 where the local aggregation port prioritized list is synchronized with partner aggregation port prioritized list. Then the local node/portal receives an operator command at 512. The operator command contains operator command attributes, and the operator command attributes includes an operator command aggregation port prioritized list for the LAG. The state machine goes to reference 504 when the local node/portal determines at reference 514 that the operator command requires a partner acknowledgment. At reference 504, the local node/portal transmits the operator command aggregation port prioritized list to partner node/portal.

The transmission is associated with a transmission timeout timer. While at state 504, if the timeout timer expires and one of the two conditions is met: (1) the operator command aggregation port prioritized list stays different from that of the partner node/portal or (2) the local node/portal has not received an acknowledgment from the partner node/portal as shown at reference 516, the transmission is repeated. The transmission may be repeated several times, until a synchronization timeout timer expires and either of the two conditions is still met as determined at reference 518. Once that happens, the state machine goes to reference 506, where the local node/portal declare out of synchronization, and a report (e.g., an failure indication) is sent out to a management interface at reference 522. At reference 524, management may intervene and achieve synchronization so the state machine goes back to reference 508. Alternatively, the state machine may transfer from reference 504 to reference 508, if the local node/portal determines that (1) the operator command aggregation port prioritized list is synchronized with the partner node/portal aggregation port prioritized list and (2) the local node/portal has received an acknowledgment from the partner node/portal at reference 515. Once the state machine reaches synchronization and the operator command is performed at reference 526, the state machine returns to initial state 502.

Methods of Supporting Operator Commands at Non-Receiving LAG Node/Portal

Figure 6:
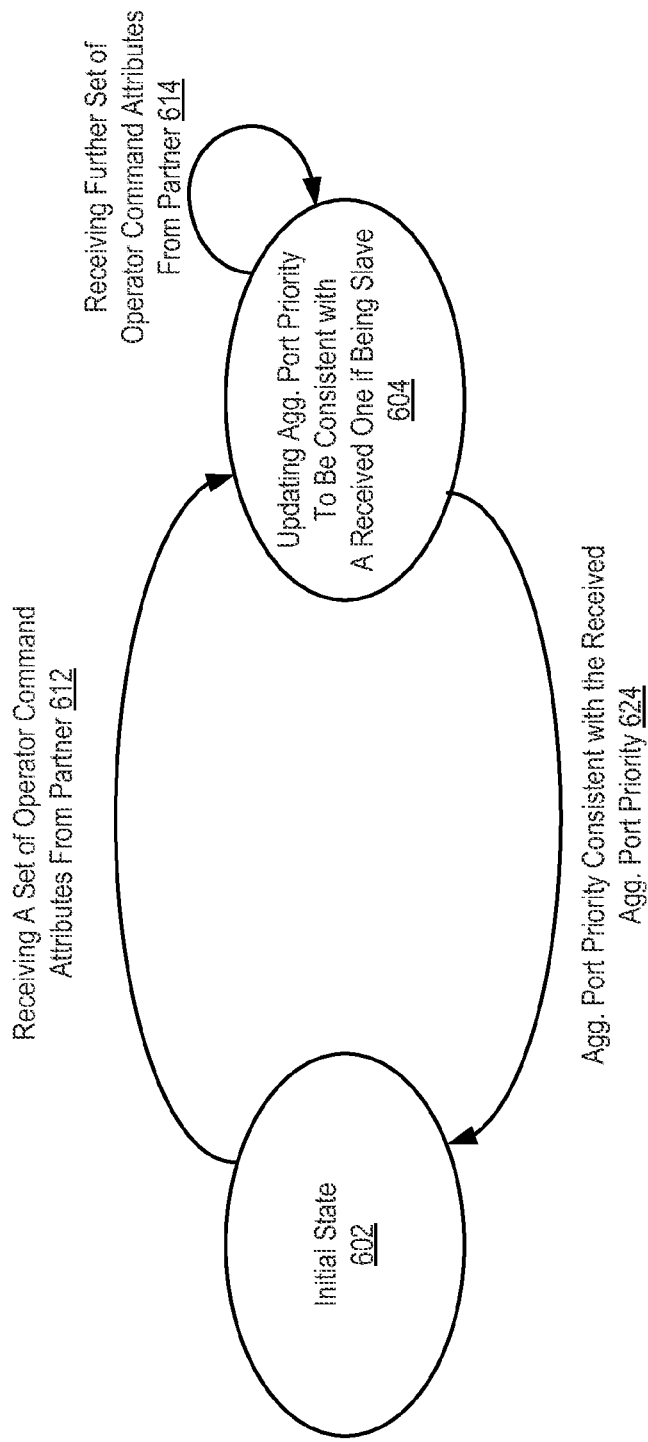
FIG. 6 illustrates methods of supporting operator commands at a LAG partner node/portal not receiving the operator commands according to one embodiment of the invention.

FIG. 6 illustrates methods of supporting operator commands at a LAG partner node/portal not receiving the operator commands according to one embodiment of the invention. The state machine is implemented at a LAG node/portal as illustrated in FIGS. 1A-C. The node/portal is at initial state 602 where the local aggregation port prioritized list is synchronized with its partner aggregation port prioritized list. Then the local node/portal receives a set of operator command attributes from its partner node/portal, and the set of operator command attributes includes an operator command aggregation port prioritized list for the LAG as determined at reference 612. The state machine goes to reference 604.

At reference 604, the local node/portal updates its aggregation port prioritized list to be consistent with the operator command aggregation port prioritized list if the local node/portal determines that it serves in a slave role. The local node/portal will also send out an acknowledgment to the partner node/portal if the associated operator command is one requiring an acknowledgment after its aggregation port prioritized list is updated to be consistent with the operator command aggregation port prioritized list. When the local node/portal continues receiving one or more sets of operator command attributes from the partner at reference 614, it stays in state 604 to update. Otherwise, when its local aggregation port prioritized list is consistent with the received operator command aggregation port prioritized list as determined at reference 624, the state machine returns to initial state 602.

Note a local node/portal may serve in a master or a slave role in exchanging operator command information. When a local node/portal serves in a master role in exchanging operator command information, it does not make changes in its local aggregation port prioritized list when it receives an operator command attributing including an operator command aggregation port prioritized list. A local node/portal serves in a slave role in exchanging operator command information changes its local aggregation port prioritized list to be consistent with a received operator command aggregation prioritized list. The master/slave role of a node/portal may be configured by a management interface of the LAG (e.g., by setting a variable of the node/portal). A LAG with both local/partner node/portal serving in a master/slave role may be configured incorrectly and need management intervention to function properly.

A Set of Embodiments Supporting LAG Operator Commands

The methods of supporting operator commands can be implemented in a variety of ways. A set of embodiments is discussed below as an illustrative example. In this example, a command is sent by a management interface to a link aggregation group and the command contains a set of parameters.

OPERATOR COMMAND [OC_Conversation_PortList[ ], WTRTime; RA] is introduced for supporting operator commands. The command indicates the execution of an operator command to "switch" service to a new aggregation port prioritized list provided by OC_Conversation_PortList[ ] (OC stands for operator command). A non-zero value for the WTRTime (stands for wait-to-restore time period) indicates a revertive mode operation. When the WTRTime is present, the node/portal receiving the command stores its existing aggregation port prioritized list, and a timer set the initial value WTRTime will start. On its expiration, a second OPERATOR COMMAND will automatically be executed reverting to the stored aggregation port prioritized list. The OPERATOR COMMAND has a further attribute of RA (Required Acknowledgment) to indicate if the operator command needs to be acknowledged by the remote partner node/portal. If RA is set then the local node/portal needs to receive an acknowledgment before executing the command on the local node/portal.

Not all types of OPERATOR COMMADND require a full new aggregation port prioritized list carried in OC_Conversation_PortList[ ]. In one embodiment, a regular MS (manual switch) or a regular FS (forced switch) command is defined as degenerated versions of the generic OPERATOR COMMAND above. The generic case can be used to switch on an individual port or service identifier (ID) basis. The "regular MS" or "regular FS" operation can be used to manual/forced switch all services from one node/portal to another. In this case no new aggregation port prioritized list will be explicitly provided or stored by an aggregation port prioritized list contracted from the original one by eliminating all the ports of other node/portal could be used. Finer refinements include a node/portal number as well as to explicitly define the node/portal that services need to be moved from—even this information could be eliminated in the case of a two portal system where one portal always moving services from the other.

Note OC_Conversation_PortList[ ] is an array of 4096 lists, indexed by port conversation identifier (ID), determining which aggregation port in the node/portal carries which port conversation ID. Each item in the array is a list of aggregation ports in this node/portal, arranged in priority order, preferably from the most desired to the least desired, for carrying the indexed port conversation ID. The variable provides OPERATOR COMMAND service to aggregation port prioritized list attribute.

In addition, the aggregation port prioritized list of a node/portal may be stored in aAggConversationAdminPort[ ], and also in Drni_Conversation_PortList[ ] and Partner_Drni_Conversation_PortList[ ] for a DRNI portal at local/partner portals respectively.

The transmitting of a set of operator command attributes may be performed by a transmission function such as xmit (OC_Conversation_PortList[ ]). The function encapsulates the prioritized list OC_Conversation_PortList[ ] provided by the OPERATOR COMMAND based on one of the three ways discussed above (i.e., through using management plane commands, OAM tools, or a control protocol) as agreed by two operators of two ends of a LAG system and transmits towards the Partner node/portal. The transmitted one or more PDUs (protocol data units) may contains a transaction identifier and further flags indicating master or slave status and the acknowledgment requirement. The transaction identifier is used to correlate responses when OPERATOR COMMAND with an RA (required acknowledgment) indication is exercised and is set by default to zero when no RA is indicated.

At the partner end receiving the set of operator command attributes, a receiving function may be implemented. A rcvPL( ) function extracts the OC_Conversation_PortList[ ] value from a received OC frame and sets the Partner_Drni_Conversation_PortList[ ] to the extracted value. If an RA flag is set, an acknowledgment value is set to true (so an acknowledgment message is sent) for the OPERATOR COMMANDS that are associated with the same transaction identifier and sets aAggConversationAdminPort[ ] equals to OC_Conversation_PortList[ ].

When two ends of a LAG system cannot reach agreement to synchronize their aggregation port prioritized lists, a reportToManagement function is invoked to alert a manager (management interface/etc) to the existence of inability of the two systems to synchronize on the prioritized lists.

Note the set of function/variable is an illustrative example only and various other functions/variables may be utilized to implement principle of embodiments of the invention without specifically using these function/variables discussed above.

Flow Diagrams for Supporting LAG Operator Commands

Figure 7:
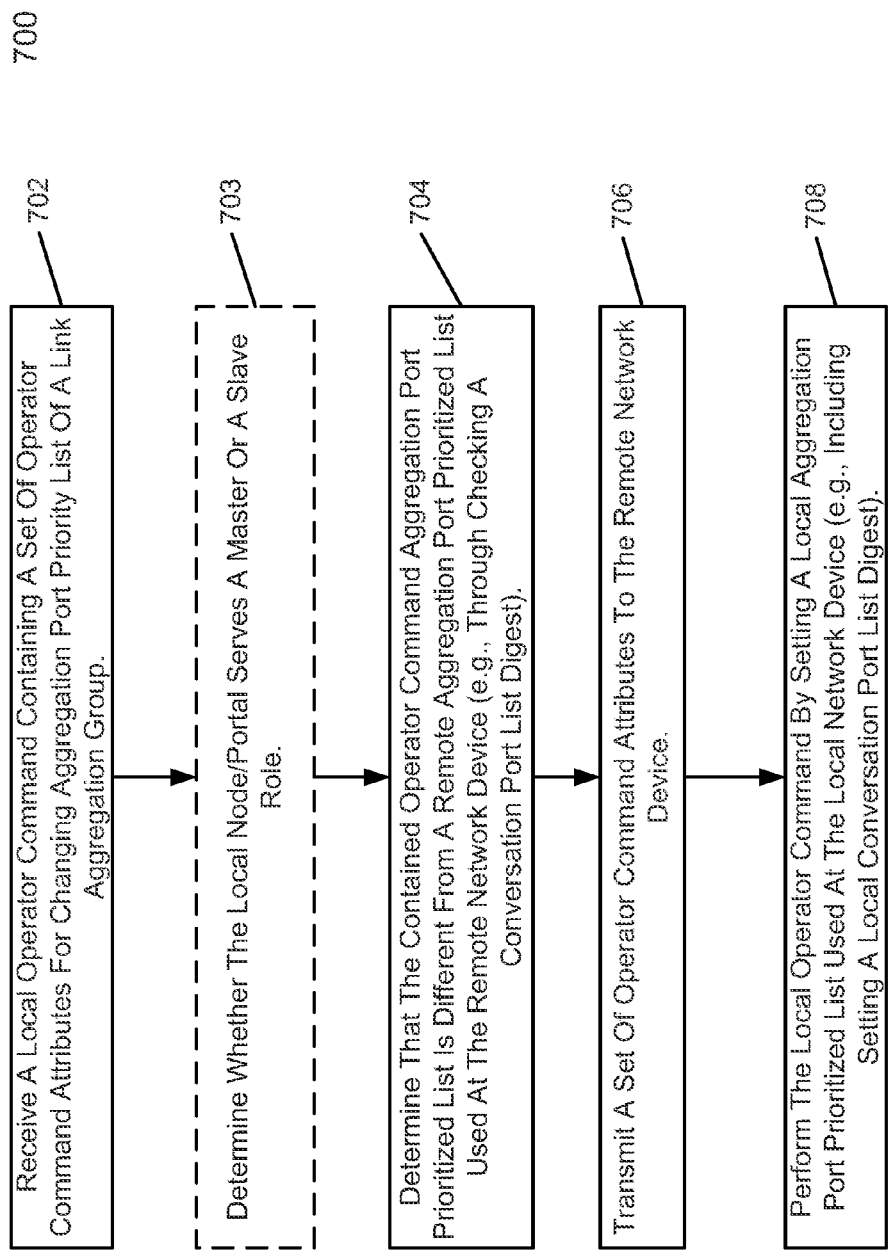
FIG. 7 is a flow diagram illustrating a process of supporting an operator command at a LAG node/portal receiving the operator command according to one embodiment of the invention.

FIG. 7 is a flow diagram illustrating a process of supporting an operator command at a LAG node/portal receiving the operator command according to one embodiment of the invention. The process 700 may be implemented at a node (network device) or a portal (including a DRNI portal) deploying a link aggregation group such as network devices 120, 122 of FIG. 1A. The process may also be implemented at portals 112 and 114 of FIG. 1B or portals 142 and 144 of FIG. 1C.

Referring to FIG. 7, the process starts with a node/portal of a link aggregation group receiving a local operator command for changing aggregation port priority of the link aggregation group at reference 702. The local operator command is in one embodiment any one of a set of commands including at least one of: manual switch, forced switch, clear, lockout, freeze, or exercise. The local operator command contains operator command attributes. The operator command attributes includes an operator command aggregation port prioritized list for the link aggregation group, which indicates desired priorities of ports for, preferably, each conversation carried in the link aggregation group. Note the operator command here is termed as "local" operator command to denote that the operator command is received at the node/portal (local node/portal), which is distinguished from the non-receiving LAG node/portal discussed herein above. Thus, the local operator command does not limit operator command in any other way.

In one embodiment, the operator command attributes also includes an indication of the local operator command being revertive or non-revertive. When the local operator command is revertive, a wait-to-restore (WTR) timer is attached. In one embodiment, the operator command attributes includes an indication whether the local operator command requires acknowledgment from a partner node/portal after a set of operator command attributes is sent to the partner node/portal. In an alternate embodiment, whether or not requiring acknowledgment is determined and agreed upon among the node/portal thus no such indication is required. In one embodiment, the set of operator command attributes also includes a transmission timeout period, expiration of which will trigger retransmission of the set of operator command attributes.

At reference 704, the receiving node/portal (i.e., the local node/portal) determines whether the operator command aggregation port prioritized list is different from a partner node/portal's aggregation port prioritized list used at the remote end of the link aggregation group. The partner node/portal's aggregation port prioritized list used at the remote end is stored at the local node/portal in a local variable through one or more PDUs carried in frames received from the remote end. For example, a variable Partner_Drni_Conversation_PortList[ ] stores the partner's aggregation port prioritized list as a DRNI portal.

In one embodiment, the determination of inconsistency of aggregation port prioritized list is made based on a digest of aggregation port prioritized list. For example, a variable Partner_Conversation_PortList may store the last received digest of the partner node/portal's prioritized conversation ID-to-aggregation port assignment, which can be utilized for the comparison. Note the local node/portal may store its digest of prioritized conversation ID-to-aggregation port assignment to a digest such as Actor_Conversation_PortList_Digest and an indication of consistency between the local and remote digest at a variable Differ_Port_Conversation_Digests.

If the operator command aggregation port prioritized list is consistent with the remote aggregation port prioritized list used at the remote node/portal, the operator command can then be performed. Otherwise, the process continues to notify the remote node/portal of the desired aggregation port priority. In one embodiment, the local node/portal determines whether the local node/portal serves in a master or a slave role of the link aggregation group after receiving the local operator command and before sending out a notification to the remote node/portal at reference 703 (optional step designated with dotted block). If the local node/portal serves in a slave role of the link aggregation group, it does not notify the partner node/portal as a node/portal serving in a slave role does not initiate changes to the remote aggregation port prioritized list. If the local node/portal serves in a master role of the link aggregation group, the process continues to reference 706.

At reference 706, the local node/portal transmits a set of operator command attributes associated with the local operator command to the partner node/portal at the remote end of the link aggregation group. The transmission may be performed by using management plane of a system including the link aggregation group, using OAM tools of the LAG, or using a new control protocol defined explicitly for operator command signaling as discussed herein above. The set of operator command attributes may be embedded in PDUs sent through frames between the two ends of the link aggregation group. The local node/portal may repeat transmission of the set of operator command attributes when a transmission timeout period expires—that is, the operator command attributes may be sent multiple times. Note the set of operator command attributes may include all or only partial of the operator command attributes associated with the local operator command. For example, the set of operator command may not include a WTR timer but include the operator command aggregation port prioritized list.

At reference 708, the local node/portal performs the local operator command by setting a local aggregation port prioritized list to be consistent with the operator command aggregation port prioritized list for the link aggregation group, where the local aggregation port prioritized list indicates priorities of ports for conversations carried in the link aggregation group. In one embodiment, the step of performing the local operator command is conditioned upon receiving an acknowledgment from the partner node/portal at the remote end of the link aggregation group. If after transmitting the set of operator command attributes, the local node/portal fails to receive an acknowledgment upon expiration of a synchronization timeout period, the local node/portal may send a failure indication to a management interface of the link aggregation group.

In one embodiment, setting the local aggregation port prioritized list includes setting a local conversation port list digest to be consistent with the operator command aggregation port prioritized list for the link aggregation group. As discussed herein above, the local conversation port list digest is a fingerprint created (through a MD5 digest for example) from the local aggregation port prioritized list.

Figure 8:
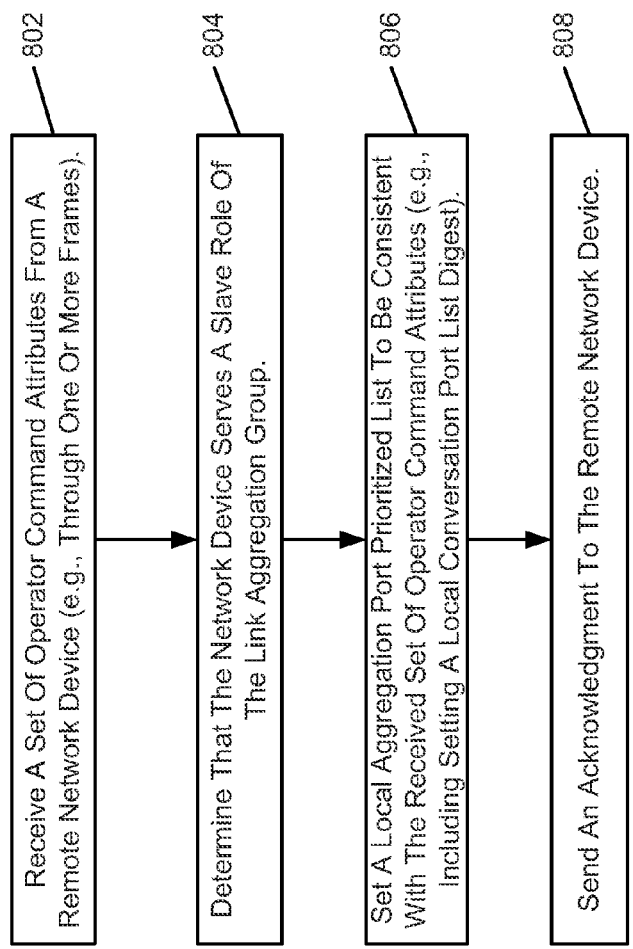
FIG. 8 is a flow diagram illustrating a process of supporting an operator command at a LAG node/portal not receiving the operator command according to one embodiment of the invention.

At the remote end of the link aggregation group, the partner node/portal receives the set operator command attributes and performs steps as illustrated in FIG. 8. FIG. 8 is a flow diagram illustrating a process of supporting an operator command at a LAG node/portal not receiving the operator command according to one embodiment of the invention. The process 800 may be implemented at a node (network device) or a portal (including a DRNI portal) deploying a link aggregation group such as network devices 120, 122 of FIG. 1A. The process may also be implemented at portals 112 and 114 of FIG. 1B or portals 142 and 144 of FIG. 1C. Indeed, a node/portal may be implemented to perform process illustrated in both FIGS. 7 and 8.

Referring to FIG. 8, the process starts with a node/portal of a link aggregation group receiving a set of operator command attributes from a partner node/portal for changing aggregation port priority of the link aggregation group at reference 802. The set of operator command attributes is associated with an operator command. In one embodiment, the set of operator command attributes also includes an indication of the local operator command being revertive or non-revertive. When the operator command is revertive, a wait-to-restore (WTR) timer is attached. In one embodiment, the set of operator command attributes is sent through one or more frames.

At reference 804, the node/portal determines whether or not it serves in a slave role of the link aggregation group. As discussed herein above, a management interface may set the node/portal to a master/slave role. If it serves in a master role, the node/portal ignores the set of operator command attributes. If it serves in a slave role, the process continues to reference 806. At reference 806, the node/portal sets a local aggregation port prioritized list to be consistent with the received set of operator command attribute. In one embodiment, the setting the local aggregation port prioritized list include setting a local conversation port list digest to be consistent with the set of operator command attributes associated with the operator command. The operator command is any one of a set of commands including at least one of: manual switch, forced switch, clear, lockout, freeze, or exercise in one embodiment.

Embodiments of Node/Portal for Supporting LAG Operator Commands

Figure 9:
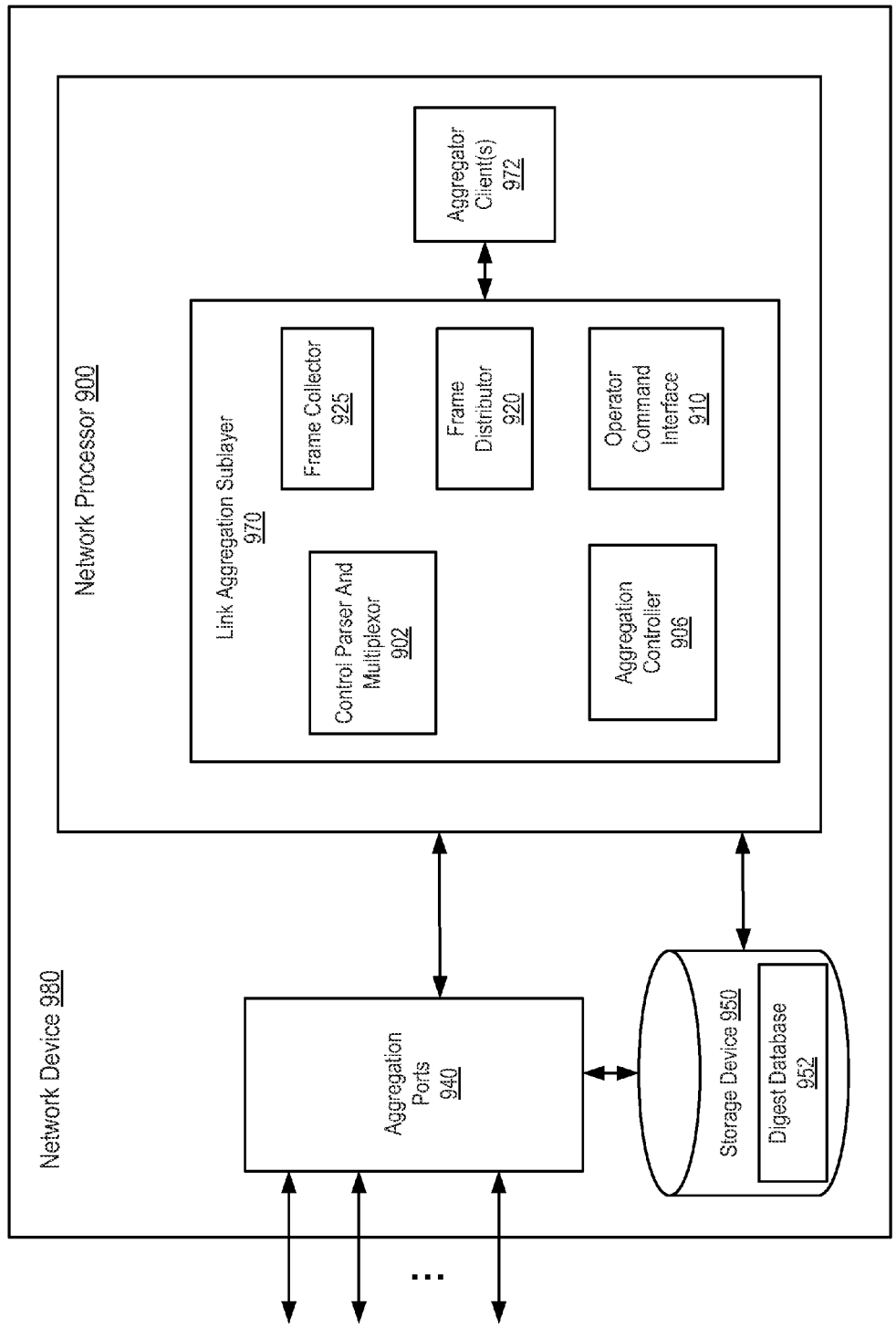
FIG. 9 is a diagram of one embodiment of a network device for supporting operator commands for a link aggregation group in a network.

FIG. 9 is a diagram of one embodiment of a network device for supporting operator commands for a link aggregation group in a network. The network device may process conversations wherein each conversation is for a service or an application in the network. The network device 980 is coupled to a remote network device (node/portal) through the link aggregation group. The network device 980 can implement a link aggregation sublayer 970 as described herein above in regard to FIG. 2 and supports the link aggregation functions described herein above. The network device 980 can include a network processor 900, a set of aggregation ports 940, a storage device 950 and similar network device components. The components of the network device are provided by way of example and not limitation. The network device 980 can implement the aggregation functions and the link aggregation sublayer 970 using any number or type of processors and with any configuration. In other embodiments, the aggregation functions and link aggregation sublayer and related components are distributed over a set of network processors, a set of line cards and their constituent general purpose and application specific processor or similar implemented in a network device architecture.

The aggregation ports 940 can connect the network device via a physical medium such as Ethernet, fiber optic, or similar medium with any number of other network devices. In one embodiment, the aggregation ports 940 are virtual/logical ports (e.g., virtual gateway port connecting a distributed relay to an aggregation system). Any number and variety of ports can be present in the network device 980. Any combination or subset of the aggregation ports 940 can be organized and managed as a Link Aggregation Group or a DRNI Portal where the network device functions as an aggregation system.

A set of storage devices 950 within the network device 980 can be any type of memory devices, caches, registers or similar storage devices for use as working memory and or persistent storage. Any number and variety of storage devices 950 can be utilized to store the data of the network device including programmed data and received data traffic to be processed by the network device 980. In one embodiment, a digest database 952 or similar organization of the conversation service mapping digest (such as Actor_Conversation_PortList_Digest, Partner_Conversation_PortList_Digest, and Diff_Port_Conversation_Digests), conversation masks, conversation allocation states of lists of conversations transmitting through the aggregation port, and similar data structures described herein above can be stored in such a data structure. Other data structures stored in the storage device 950 can include the aAggConversationAdminPort[ ], Drni_Conversation_PortList[ ], and similar data structures. In other embodiments, these data structures can be conceived as being independent and can be distributed over any number of separate storage devices 950 within the network device 980.

A set of network processors 900 can implement the aggregation functions and the link aggregation sublayer 970 described herein above. The aggregation functions can include aggregator client(s) 972, and the link aggregation sublayer 970, which can include the control parser/multiplexor 902, aggregation controller 906, frame collector 925, frame distributor 920 and operator command interface 910. As described further herein above, the aggregator client(s) 972 can provide higher level functions of the network device such as Layer 3 functions and similar higher level functions.

The aggregation controller 906 as described further herein above, can implement link aggregation control and the link aggregation control protocol functions. These functions manage the configuration and allocation of link aggregation groups, the DRNI portal and similar aspects. The control parser and multiplexer 902 identifies and forwards PDUs from the other data traffic received on the aggregation ports and sends the CPDUs to the aggregation controller 906 and other data traffic to the link aggregation sublayer 970.

The link aggregation sublayer 970 as described further herein above, manages the collection and distribution of the frames according to the distribution algorithm. Within the link aggregation sublayer 970 frame collector 925 receives the frames and organizes them according to the distribution algorithm shared with the partner system across the link aggregation group. A frame distributor 920 prepares and selects the outbound frames for transmission over a set of aggregation ports according to the distribution algorithm. Operator command interface 910 coordinates receiving and processing operator commands received.

In one embodiment, the operator command interface 910 is configured to receive a local operator command for changing aggregation port priority of the link aggregation group, where the local operator command contains operator command attributes including an operator command aggregation port prioritized list for the link aggregation group, and where the operator command aggregation port prioritized list indicates desired priorities of ports for conversations carried in the link aggregation group. The aggregation controller 906 is configured to determine that the operator command aggregation port prioritized list is different from a remote aggregation port prioritized list used at the remote network device. Then aggregation controller 906 is configured to cause the set of aggregation port 940 to transmit a set of operator command attributes associated with the local operator command to the remote network device (node/portal), the set of operator command attributes including the operator command aggregation port prioritized list. In one embodiment, transmitting the set of operator command attributes to the remote network device is repeated after a transmission timeout period. The aggregation controller 906 is further configured to perform the local operator command by setting a local aggregation port prioritized list to be consistent with the operator command aggregation port prioritized list for the link aggregation group, where the local aggregation port prioritized list indicates priorities of ports for conversations carried in the link aggregation group.

In one embodiment, the aggregation controller 906 is further configured to determine whether the network device 980 serves in a master or a slave role of the link aggregation group after receiving the local operator command and before transmitting the set of operator command attributes—when the network device 980 serves in a slave role, the set of operator command attributes is not sent.

In one embodiment, performing the local operator command is conditioned upon receiving an acknowledgement from the remote network device. In addition, the aggregation controller 906 is configured to send a failure indication to a management interface after transmitting the set of operator command attributes to the remote network device upon expiration of a timeout period for receiving an acknowledgement from the remote network device.

In one embodiment, setting the setting the local aggregation port prioritized list includes setting a local conversation port list digest to be consistent with the operator command aggregation port prioritized list for the link aggregation group, where the local conversation port list digest is a fingerprint created from the local aggregation port prioritized list. In one embodiment, determining that the operator command aggregation port prioritized list is different from a remote aggregation port prioritized list includes determining a remote conversation port list digest is inconsistent with the operator command aggregation port prioritized list.

As discussed herein above, the local operator command is any one of a set of commands including at least one of: manual switch, forced switch, clear, lockout, freeze, or exercise. In addition, the set of operator command attributes includes an indication of the local operator command being any one of revertive or non-revertive.

While the network device 980 may be implemented to transmit a set of operator command attributes to another network device, which makes the network device 980 to be a local node/portal of the link aggregation group. Network device 980 may be configured to perform as a partner node/portal not receiving the local operator commands.

In one embodiment, the set of aggregation ports 940 is configured to receive frames over the link of the link aggregation group, where the frames contain a set of operator command attributes from a remote network device, and wherein the set of operator command attributes is associated with an operator command. In one embodiment, the operator command is any one of a set of commands including at least one of: manual switch, forced switch, clear, lockout, freeze, or exercise. The set of operator command attributes may include an indication of a local operator command being revertive or non-revertive, where being revertive is associated with a wait-to-restore timer.

In the embodiment, the aggregation controller 906 is configured to determine that the network device serves a slave role of the link aggregation group. The aggregation controller 906 is further configured to set a local aggregation port prioritized list to be consistent with the received set of operator command attributes, where the local aggregation port prioritized list indicates priorities of ports for conversations carried in the link aggregation group. In addition, the aggregation controller 906 is configured to send an acknowledgment to the remote network device after the local aggregation port prioritized list is set to be consistent with the received set of operator command attributes.

As discussed herein above, a non-transitory machine readable storage medium may have instructions stored therein, which when executed by a processor, causes the processor perform operations implemented by a network device. The network device is one illustrated in FIG. 9 and discussed herein above in one embodiment. The network device is communicatively coupled with aggregation ports through links of a link aggregation group to a remote network device, where the network device processes conversations, and where each conversation contains an ordered sequence of frames. The operations include steps illustrated in FIG. 7 and discussed hereinabove in one embodiment. In another embodiment, the operations include steps illustrated in FIG. 8 and discussed herein above.

Note the operations of the flow diagrams in FIGS. 7 and 8 are described with reference to the exemplary embodiment of FIG. 9. However, it should be understood that the operations of flow diagrams can be performed by embodiments of the invention other than those discussed with reference to FIG. 9, and the embodiments discussed with reference to FIG. 9 can perform operations different than those discussed with reference to the flow diagrams of FIGS. 7 and 8.

While the flow diagrams in the figures herein above show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several example embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of supporting operator commands in a link aggregation group at a network device, wherein the network device is communicatively coupled with aggregation ports through links of the link aggregation group to a remote network device, wherein the network device processes conversations, the method comprising:
receiving a local operator command for changing aggregation port priority of the link aggregation group, wherein the local operator command is one of a set of commands including at least one of manual switch, forced switch, clear, lockout, freeze, or exercise, wherein the local operator command contains operator command attributes including an operator command aggregation port prioritized list for the link aggregation group, wherein the operator command aggregation port prioritized list indicates desired priorities of ports for conversations carried in the link aggregation group, and wherein each conversation contains an ordered sequence of frames;
determining that the operator command aggregation port prioritized list is different from a remote aggregation port prioritized list used at the remote network device;
transmitting a set of operator command attributes associated with the local operator command to the remote network device, the set of operator command attributes including at least the operator command aggregation port prioritized list; and
performing the local operator command by setting a local aggregation port prioritized list to be consistent with the operator command aggregation port prioritized list for the link aggregation group, wherein the local aggregation port prioritized list indicates priorities of ports for conversations carried in the link aggregation group.

2. The method of claim 1, further comprising:
determining whether the network device serves in a master or a slave role of the link aggregation group after receiving the local operator command.

3. The method of claim 1, wherein performing the local operator command is conditioned upon receiving an acknowledgement from the remote network device.

4. The method of claim 1, further comprising:
sending a failure indication to a management interface after transmitting the set of operator command attributes to the remote network device upon expiration of a timeout period for receiving an acknowledgement from the remote network device.

5. The method of claim 1, wherein setting the local aggregation port prioritized list comprises:
setting a local conversation port list digest to be consistent with the operator command aggregation port prioritized list for the link aggregation group, wherein the local conversation port list digest is a fingerprint created from the local aggregation port prioritized list.

6. The method of claim 5, wherein determining that the operator command aggregation port prioritized list is different from a remote aggregation port prioritized list comprises:
determining a remote conversation port list digest is inconsistent with the operator command aggregation port prioritized list.

7. The method of claim 1, wherein the remote network device performs:
receiving the set of operator command attributes from the network device;
determining that the remote network device serves a slave role of the link aggregation group;
setting a remote aggregation port prioritized list to be consistent with the received set of operator command attributes; and
sending an acknowledgment to the network device after the remote aggregation port prioritized list is set to be consistent with the received set of operator command attributes.

8. The method of claim 1, wherein the set of operator command attributes is sent through one or more frames.

9. The method of claim 1, wherein the set of operator command attributes includes an indication of the local operator command being any one of revertive or non-revertive.

10. The method of claim 1, wherein transmitting the set of operator command attributes to the remote network device is repeated after a transmission timeout period.

11. The method of claim 1, wherein the network device and the remote network device belong to a single distributed resilient network interconnect (DRNI).

12. A method of supporting operator commands in a link aggregation group at a network device, wherein the network device is communicatively coupled with aggregation ports through links of the link aggregation group to a remote network device, wherein the network device processes conversations, the method comprising:
receiving a set of operator command attributes from the remote network device, wherein the set of operator command attributes is associated with an operator command, and wherein the operator command is one of a set of commands including at least one of manual switch, forced switch, clear, lockout, freeze, or exercise, and wherein the operator command contains operator command attributes including an operator command aggregation port prioritized list for the link aggregation group;
determining that the network device serves a slave role of the link aggregation group;
setting a local aggregation port prioritized list to be consistent with the received set of operator command attributes, wherein the local aggregation port prioritized list indicates priorities of ports for conversations carried in the link aggregation group, and wherein each conversation contains an ordered sequence of frames; and
sending an acknowledgment to the remote network device after the local aggregation port prioritized list is set to be consistent with the received set of operator command attributes.

13. The method of claim 12, wherein setting the local aggregation port prioritized list comprises:
setting a local conversation port list digest to be consistent with a set of operator command aggregation port prioritized list for the link aggregation group included in the set of operator command attributes, wherein the local conversation port list digest is a fingerprint created from the local aggregation port prioritized list.

14. The method of claim 12, wherein the set of operator command attributes includes an indication of a local operator command being any one of revertive or non-revertive.

15. A network device configured to be communicatively coupled with aggregation ports through links of a link aggregation group to a remote network device, wherein the network device processes conversation, the network device comprising:
　　a set of aggregated ports configured to transmit and receive frames over the link of the link aggregation group; and
　　a network processor including:
　　　　an operator command interface configured to receive a local operator command for changing aggregation port priority of the link aggregation group, wherein the local operator command is one of a set of commands including at least one of manual switch, forced switch, clear, lockout, freeze, or exercise, wherein the local operator command contains operator command attributes including an operator command aggregation port prioritized list for the link aggregation group, wherein the operator command aggregation port prioritized list indicates desired priorities of ports for conversations carried in the link aggregation group, and wherein each conversation contains an ordered sequence of frames;
　　　　an aggregation controller configured to determine that the operator command aggregation port prioritized list is different from a remote aggregation port prioritized list used at the remote network device;
　　　　the aggregation controller further configured to cause the set of aggregation port to transmit a set of operator command attributes associated with the local operator command to the remote network device, the set of operator command attributes including at least the operator command aggregation port prioritized list; and
　　　　the aggregation controller further configured to perform the local operator command by setting a local aggregation port prioritized list to be consistent with the operator command aggregation port prioritized list for the link aggregation group, wherein the local aggregation port prioritized list indicates priorities of ports for conversations carried in the link aggregation group.

16. The network device of claim 15, wherein the aggregation controller further configured to determine whether the network device serves in a master or a slave role of the link aggregation group after receiving the local operator command.

17. The network device of claim 15, wherein performing the local operator command is conditioned upon receiving an acknowledgement from the remote network device.

18. The network device of claim 15, wherein the aggregation controller further configured to send a failure indication to a management interface after transmitting the set of operator command attributes to the remote network device upon expiration of a timeout period for receiving an acknowledgement from the remote network device.

19. The network device of claim 15, wherein setting the local aggregation port prioritized list comprises:
　　setting a local conversation port list digest to be consistent with the operator command aggregation port prioritized list for the link aggregation group, wherein the local conversation port list digest is a fingerprint created from the local aggregation port prioritized list.

20. The network device of claim 19, wherein determining that the operator command aggregation port prioritized list is different from a remote aggregation port prioritized list comprises:
　　determining a remote conversation port list digest is inconsistent with the operator command aggregation port prioritized list.

21. The network device of claim 15, wherein the remote network device performs:
　　receiving the set of operator command attributes from the network device;
　　determining that the remote network device serves a slave role of the link aggregation group;
　　setting a remote aggregation port prioritized list to be consistent with the received set of operator command attributes; and
　　sending an acknowledgment to the network device after the remote aggregation port prioritized list is set to be consistent with the received set of operator command attributes.

22. The network device of claim 15, wherein the set of operator command attributes includes an indication of the local operator command being any one of revertive or non-revertive.

23. The network device of claim 15, wherein transmitting the set of operator command attributes to the remote network device is repeated after a transmission timeout period.

24. The network device of claim 15, wherein the network device and the remote network device belong to a single distributed resilient network interconnect (DRNI).

25. A network device configured to be communicated coupled with aggregation ports through links of a link aggregation group to a remote network device, wherein the network device processes conversation, the network device comprising:
　　a set of aggregation ports configured to receive frames over the link of the link aggregation group, wherein the frames contain a set of operator command attributes from the remote network device, and wherein the set of operator command attributes is associated with an operator command, wherein the operator command is one of a set of commands including at least one of manual switch, forced switch, clear, lockout, freeze, or exercise, and wherein the operator command contains operator command attributes including an operator command aggregation port prioritized list for the link aggregation group; and
　　a network processor including:
　　　　an aggregation controller configured to determine that the network device serves a slave role of the link aggregation group;
　　　　the aggregation controller further configured to set a local aggregation port prioritized list to be consistent with the received set of operator command attributes, wherein the local aggregation port prioritized list indicates priorities of ports for conversations carried in the link aggregation group, and wherein each conversation contains an ordered sequence of frames, and
　　　　the aggregation controller further configured to send an acknowledgment to the remote network device after the local aggregation port prioritized list is set to be consistent with the received set of operator command attributes.

26. The network device of claim 25, wherein setting the local aggregation port prioritized list comprises:
　　setting a local conversation port list digest to be consistent with the set of operator command attributes, wherein the local conversation port list digest is a fingerprint created from the local aggregation port prioritized list.

27. The network device of claim 25, wherein the set of operator command attributes includes an indication of a local operator command being any one of revertive or non-revertive.

28. A non-transitory machine-readable storage medium having instructions stored therein, which when executed by a processor, causes the processor to perform operations implemented by a network device for supporting operator commands in a link aggregation group at a network device, wherein the network device is communicatively coupled with aggregation ports through links of the link aggregation group to a remote network device, wherein the network device processes conversations, the operations comprising the steps of:
- receiving a local operator command for changing aggregation port priority of the link aggregation group, wherein the operator command is one of a set of commands including at least one of manual switch, forced switch, clear, lockout, freeze, or exercise, wherein the local operator command contains operator command attributes including an operator command aggregation port prioritized list for the link aggregation group, and wherein the operator command aggregation port prioritized list indicates desired priorities of ports for conversations carried in the link aggregation group, and wherein each conversation contains an ordered sequence of frames;
- determining that the operator command aggregation port prioritized list is different from a remote aggregation port prioritized list used at the remote network device;
- transmitting a set of operator command attributes associated with the local operator command to the remote network device, the set of operator command attributes including at least the operator command aggregation port prioritized list; and
- performing the local operator command by setting a local aggregation port prioritized list to be consistent with the operator command aggregation port prioritized list for the link aggregation group, wherein the local aggregation port prioritized list indicates priorities of ports for conversations carried in the link aggregation group.

29. A non-transitory machine-readable storage medium having instructions stored therein, which when executed by a processor, causes the processor to perform operations implemented by a network device for supporting operator commands in a link aggregation group at a network device, wherein the network device is communicatively coupled with aggregation ports through links of the link aggregation group to a remote network device, wherein the network device processes conversations, the operations comprising the steps of:
- receiving a set of operator command attributes from the remote network device, wherein the set of operator command attributes is associated with an operator command, wherein the operator command is one of a set of commands including at least one of manual switch, forced switch, clear, lockout, freeze, or exercise, and wherein the operator command contains operator command attributes including an operator command aggregation port prioritized list for the link aggregation group;
- determining that the network device serves a slave role of the link aggregation group;
- setting a local aggregation port prioritized list to be consistent with the received set of operator command attributes, wherein the local aggregation port prioritized list indicates priorities of ports for conversations carried in the link aggregation group, and wherein each conversation contains an ordered sequence of frames; and
- sending an acknowledgment to the remote network device after the local aggregation port prioritized list is set to be consistent with the received set of operator command attributes.

* * * * *